US012420853B2

(12) United States Patent
Gardner

(10) Patent No.: US 12,420,853 B2
(45) Date of Patent: Sep. 23, 2025

(54) PERSONAL SHOPPING CART AND METHOD OF USE

(71) Applicant: Jason Gardner, Los Angeles, CA (US)

(72) Inventor: Jason Gardner, Los Angeles, CA (US)

( * ) Notice: Subject to any disclaimer, the term of this patent is extended or adjusted under 35 U.S.C. 154(b) by 0 days.

(21) Appl. No.: 18/670,420

(22) Filed: May 21, 2024

(65) Prior Publication Data
US 2024/0300562 A1  Sep. 12, 2024

Related U.S. Application Data

(63) Continuation of application No. 18/157,091, filed on Jan. 20, 2023, now Pat. No. 12,017,694, which is a continuation of application No. 16/987,315, filed on Aug. 6, 2020, now Pat. No. 11,590,995.

(60) Provisional application No. 62/883,981, filed on Aug. 7, 2019.

(51) Int. Cl.
  *B62B 3/02* (2006.01)
  *B62B 3/14* (2006.01)
  *B62B 3/16* (2006.01)

(52) U.S. Cl.
  CPC ............ *B62B 3/027* (2013.01); *B62B 3/1496* (2013.01); *B62B 3/16* (2013.01)

(58) Field of Classification Search
  CPC ......... B62B 3/027; B62B 3/1496; B62B 3/16; B62B 3/1416; B62B 3/1424; B62B 3/1428; B62B 5/0003; B62B 2205/006; B62B 2206/006; B62B 3/1484; B62B 3/165; B62B 5/0093; B62B 5/064
  See application file for complete search history.

(56) References Cited

U.S. PATENT DOCUMENTS

| | | | |
|---|---|---|---|
| 2,133,834 A | 10/1938 | Sheldon | |
| 3,121,496 A | 2/1964 | Brunette | |
| 3,789,957 A * | 2/1974 | Close | A47F 9/04 |
| | | | 280/33.993 |
| 4,346,907 A * | 8/1982 | Swann | B62B 1/12 |
| | | | 280/654 |

(Continued)

FOREIGN PATENT DOCUMENTS

| | | | |
|---|---|---|---|
| BR | MU8801106 U2 * | 4/2009 | |
| CN | 201472429 U | 5/2010 | |

(Continued)

OTHER PUBLICATIONS

WO-2011124769-A1 English Translation (Year: 2011).*

(Continued)

*Primary Examiner* — Michael T. Walsh
(74) *Attorney, Agent, or Firm* — DANE IP Law PC

(57) ABSTRACT

A shopping cart basket comprises one or more modular baskets couplable to a bottom basket having a plurality of wheels extending downwardly to allow the shopping cart basket to roll. Each of the modular baskets has a foldable bottom wall that can act as a bottom of a separate basket or can be folded against a side wall of the modular basket. The modular baskets could be used to hold items within a smaller compartment, and can be combined with the bottom basket to form a roll-able shopping cart having a larger compartment. Such a cart is advantageously used in a store, such as a grocery store, a retail shopping mall, or a home improvement store.

15 Claims, 38 Drawing Sheets

(56) References Cited

U.S. PATENT DOCUMENTS

| | | | | |
|---|---|---|---|---|
| 4,373,611 | A | * | 2/1983 | Frederick ............... B62B 3/148 186/64 |
| 6,131,926 | A | | 10/2000 | Harlan |
| 7,134,673 | B2 | | 11/2006 | Ferraro |
| 7,188,847 | B1 | | 3/2007 | Friedman |
| 7,703,776 | B1 | | 4/2010 | Nugent |
| D656,288 | S | | 3/2012 | Walter |
| 8,540,273 | B2 | | 9/2013 | Dobrachinski |
| 9,090,276 | B1 | | 7/2015 | Ihrke |
| 11,396,315 | B1 | | 7/2022 | Mittel |
| 2005/0012286 | A1 | | 1/2005 | Woodrow |
| 2005/0156406 | A1 | * | 7/2005 | Prather ................. B62B 3/142 280/651 |
| 2009/0309322 | A1 | | 12/2009 | Selvig |
| 2012/0261907 | A1 | | 10/2012 | White |
| 2019/0256118 | A1 | * | 8/2019 | Robinson ................. B62B 3/02 |

FOREIGN PATENT DOCUMENTS

| | | | | |
|---|---|---|---|---|
| CN | 205615550 U | | 10/2016 | |
| CN | 206307086 U | | 7/2017 | |
| DE | 2327590 A1 | * | 12/1974 | |
| EP | 0286520 A1 | * | 10/1988 | |
| ES | 1111330 U | * | 6/2014 | |
| FR | 2579158 A1 | | 9/1986 | |
| GB | 2514850 A | | 12/2014 | |
| JP | 2001346622 A | | 12/2001 | |
| WO | WO-9421506 A1 | * | 9/1994 | ............... B62B 3/02 |
| WO | WO-0049935 A1 | * | 8/2000 | ........... A47L 15/503 |
| WO | WO-2011124769 A1 | * | 10/2011 | ............. B62B 3/005 |

OTHER PUBLICATIONS

WO-0049935-A1 English Translation (Year: 2000).*
ES-1111330-U English Translation (Year: 2014).*
WO-9421506-A1 English Translation (Year: 1994).*
DE-2327590-A1 English Translation (Year: 1974).*
EP-0286520-A1 English Translation (Year: 1988).*
BR-MU8801106-U2 English Translation (Year: 2009).*
"Foldable Cart on Wheels Folding Platform Truck With 6 Wheels," Dec. 14, 2018, 1 page.
Chui, Claudia, "Design Thinking," The Medium blog, Oct. 6, 2016, 3 pages [online]. Retrieved from the Internet: <URL:https://medium.com/@claudiachui/design-thinking-27b2aaba6688>.
Premier Carts, "Scout Cart Personal Folding Shopping Cart with two baskets," 2 pages [online], retrieved on Dec. 14, 2018. Retrieved from the Internet: <URL:https://premiercarts.com/SC_ScoutCart.html>.
Versacart, "Products," 7 pages [online], retrieved on Dec. 14, 2020. Retrieved from the Internet: <URL:https://versacart.com/products/>.

* cited by examiner

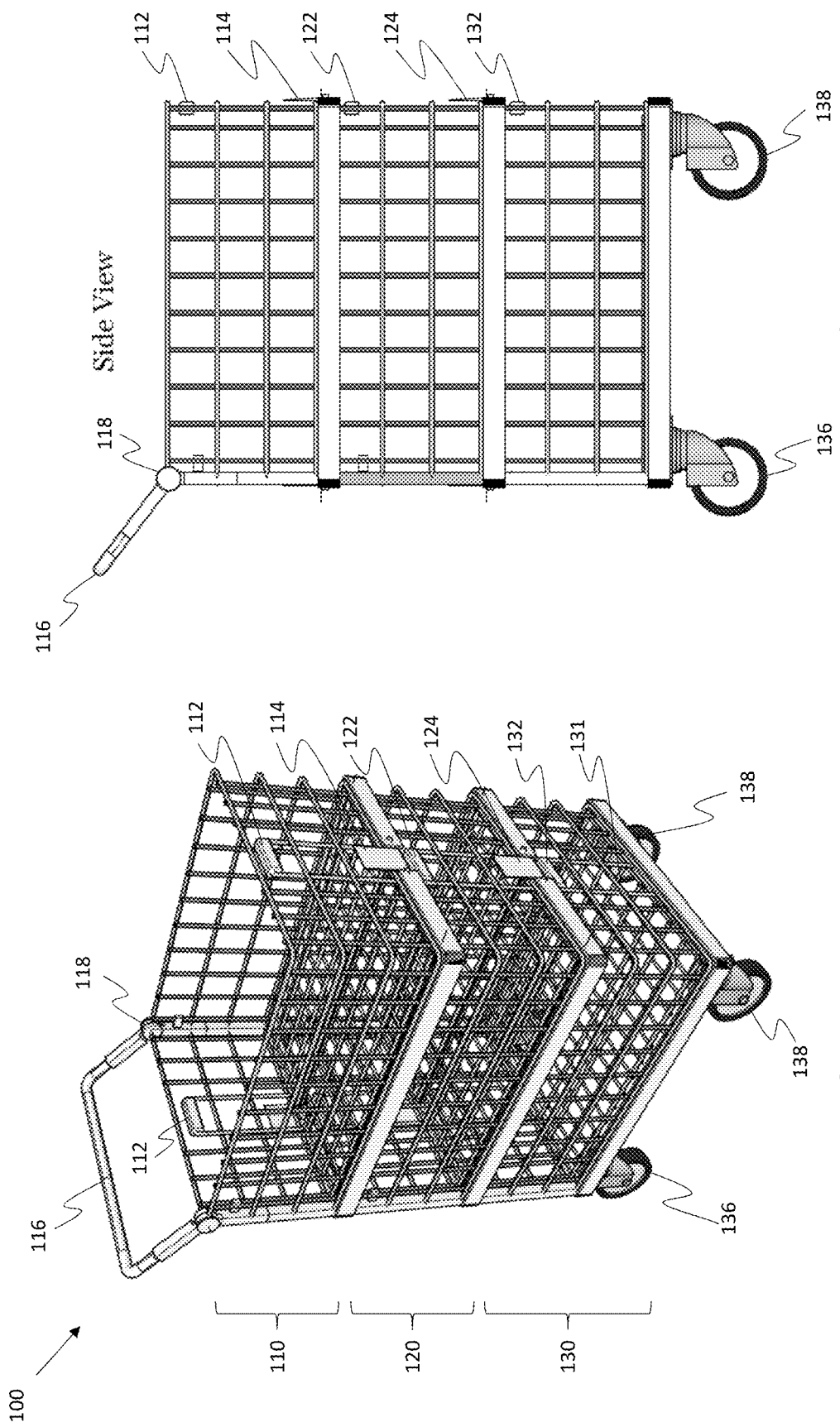

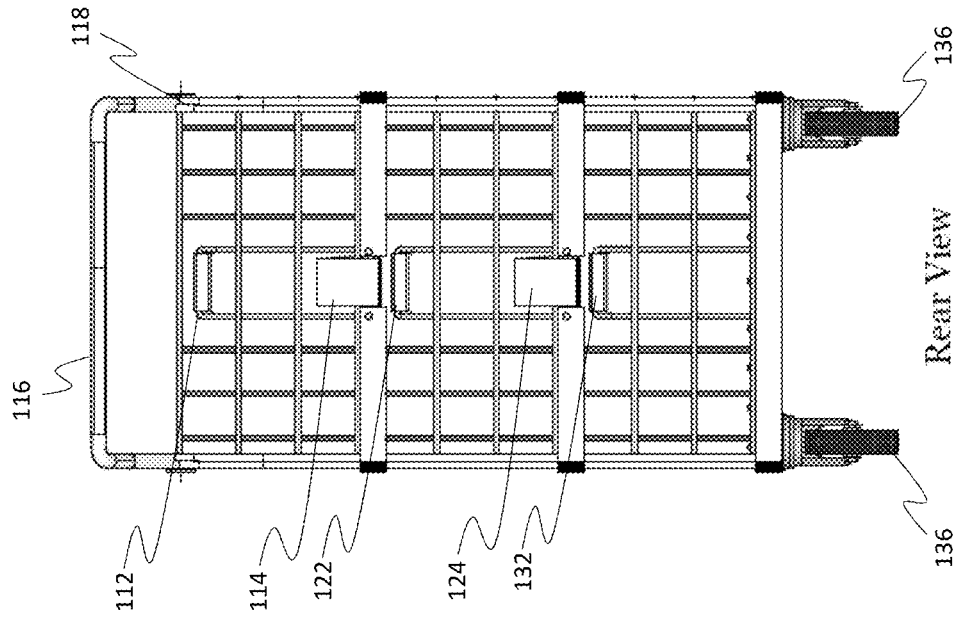
Figure 1C Front View
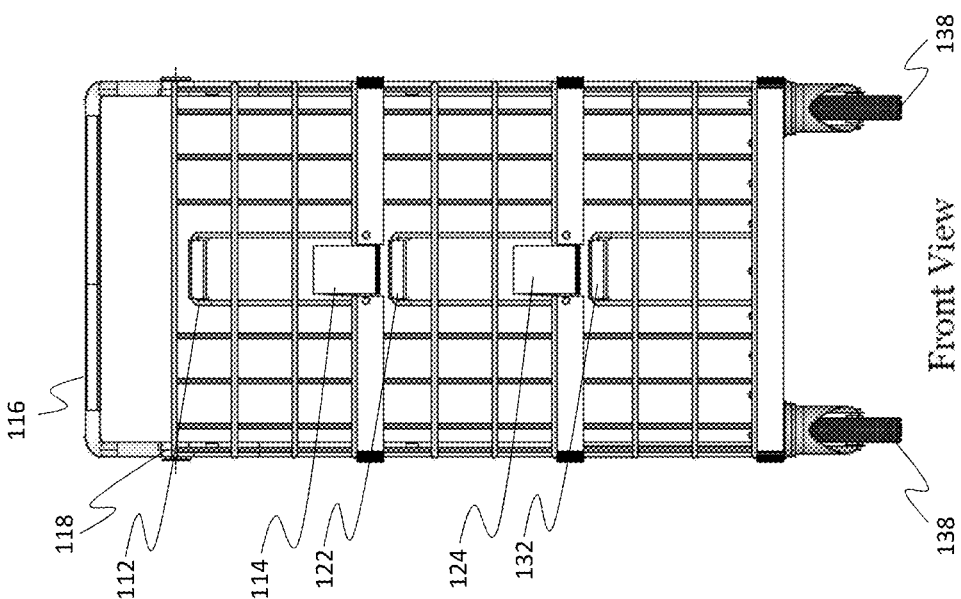
Figure 1D Rear View

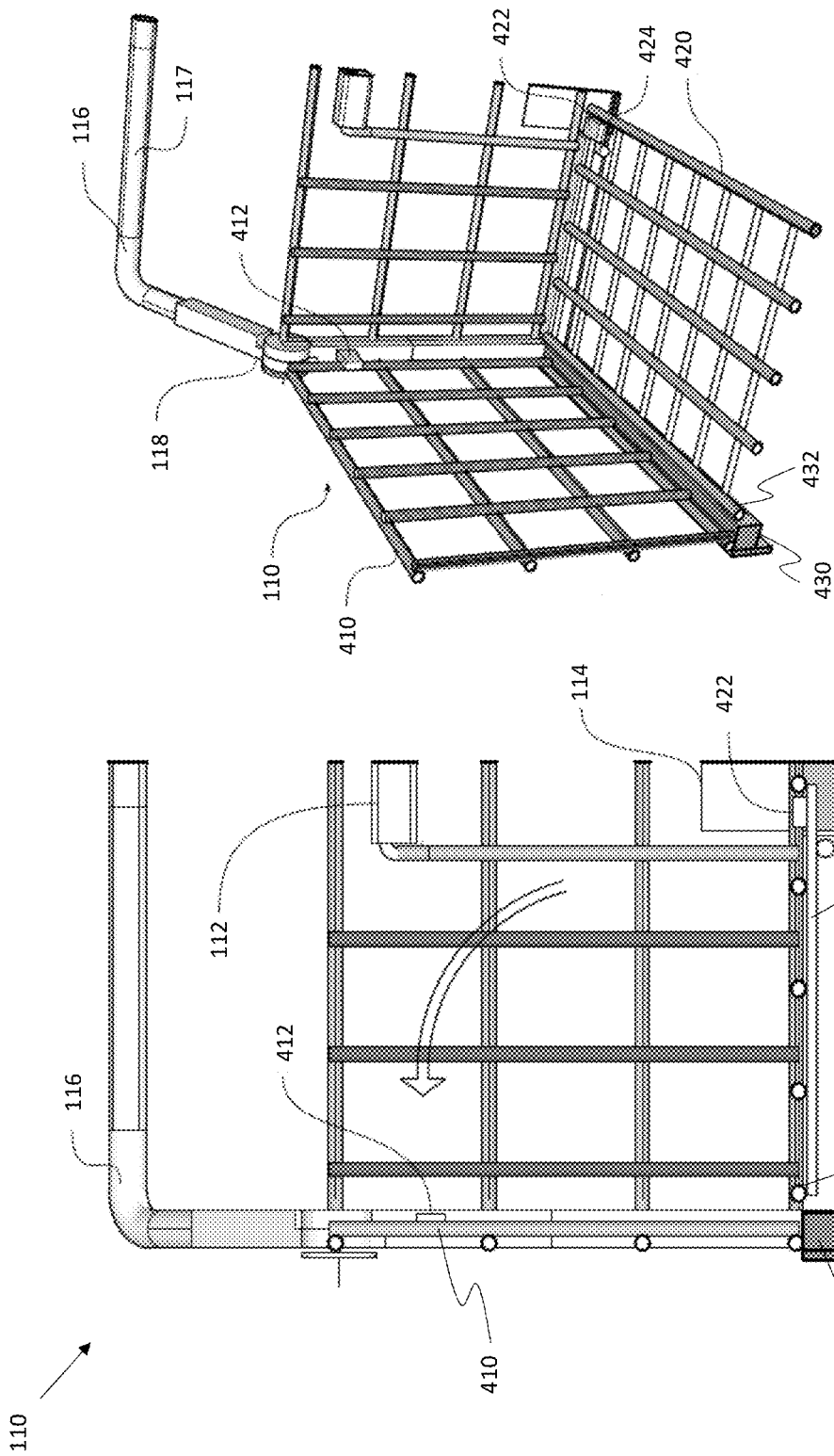

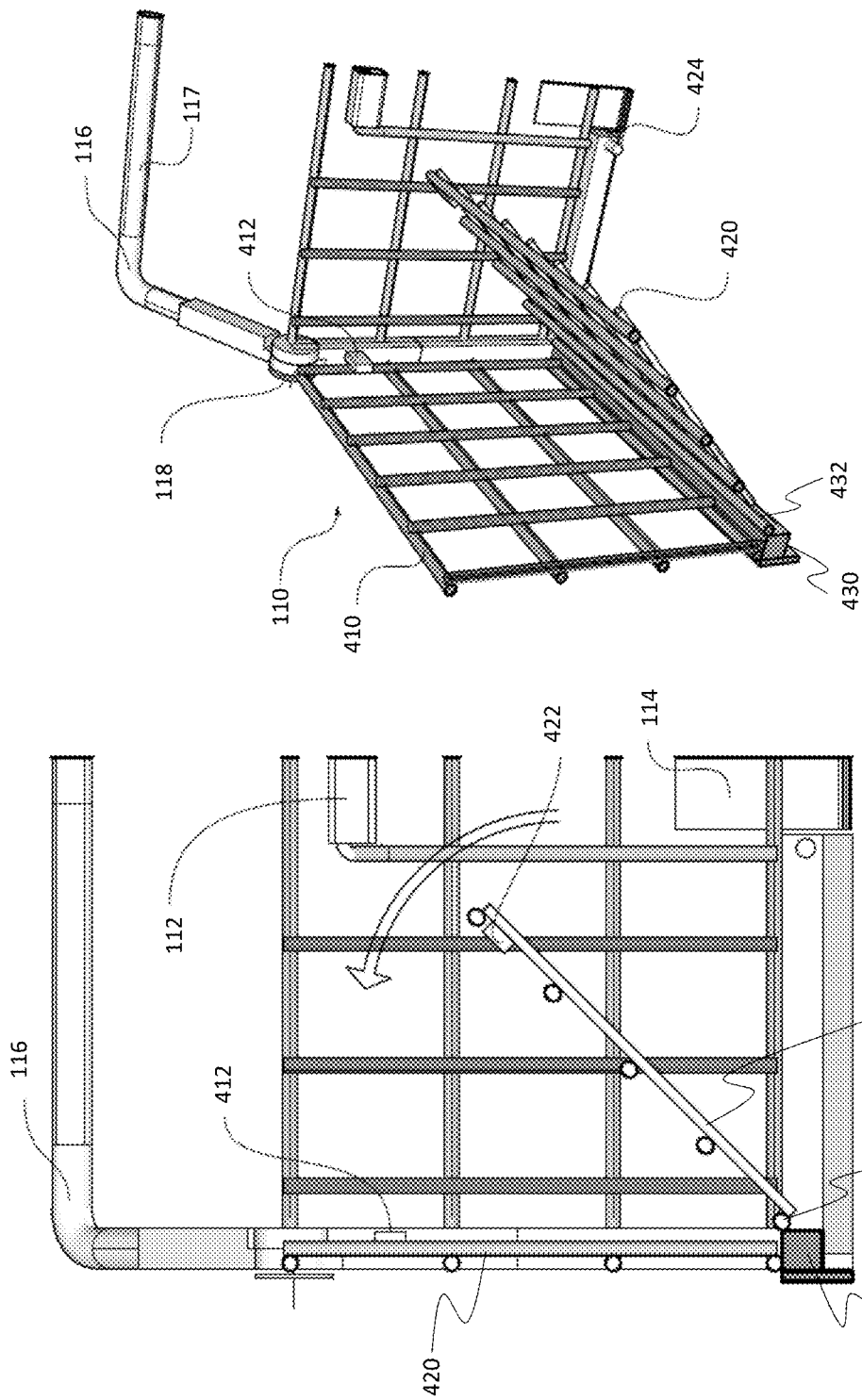

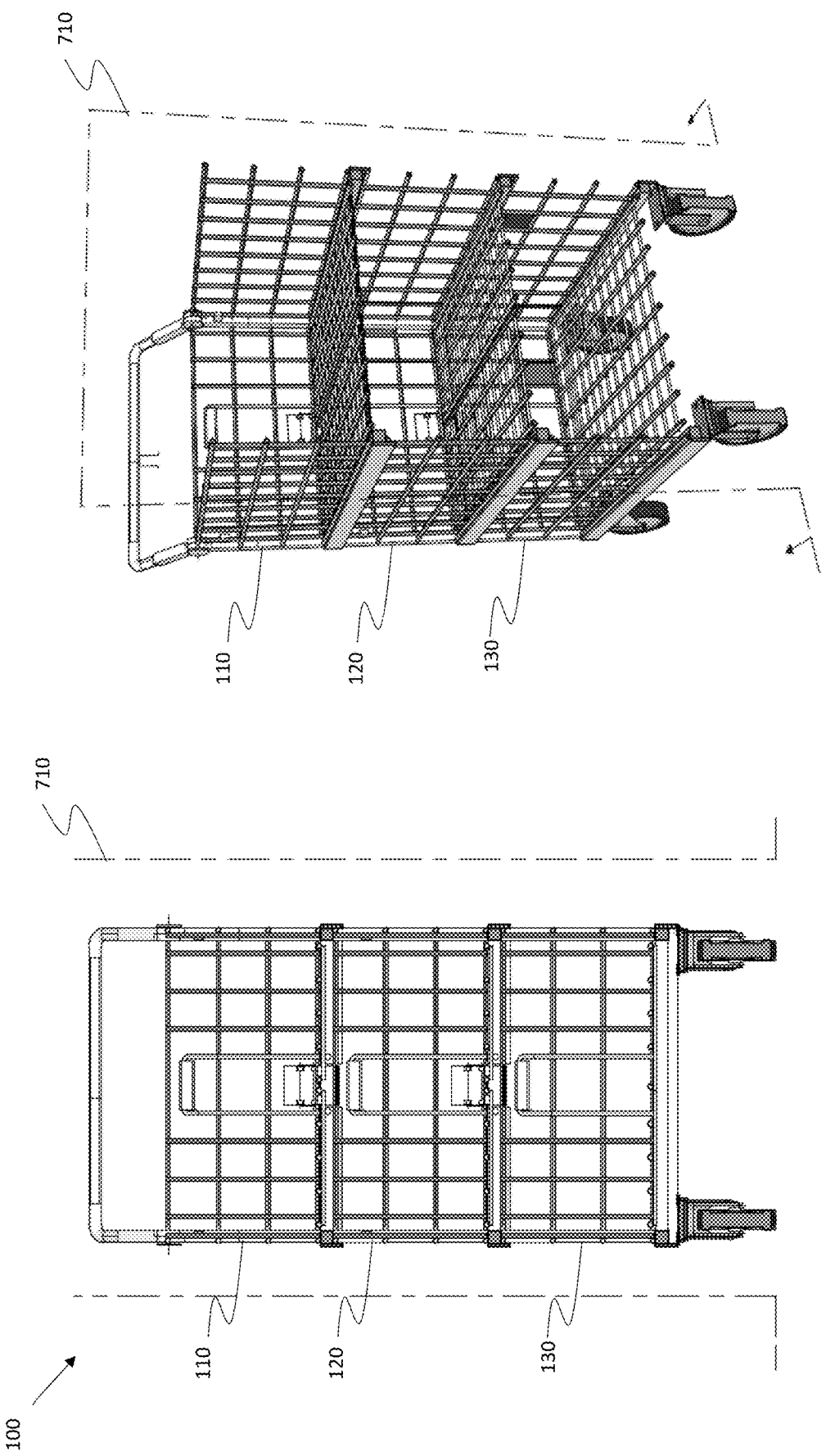

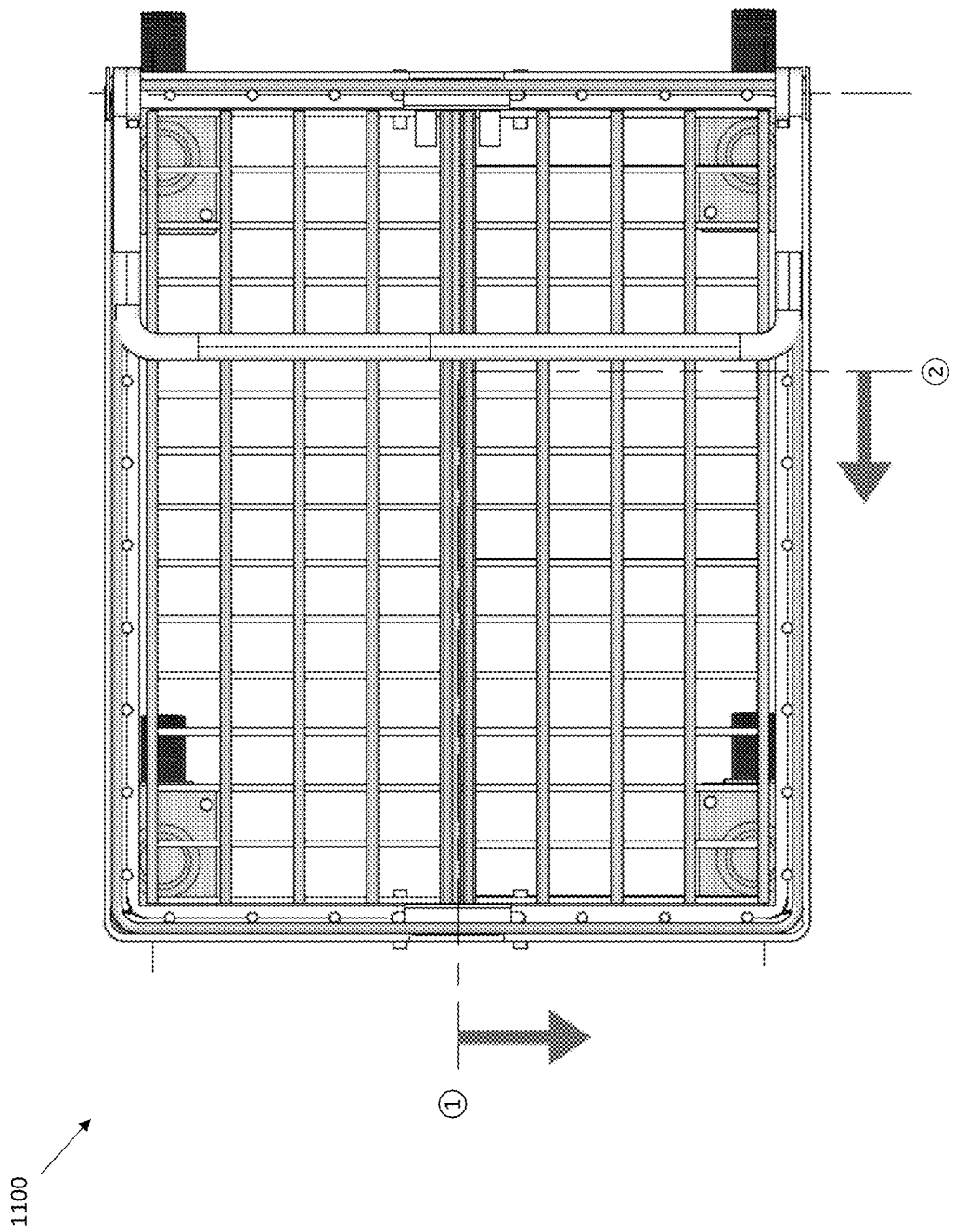

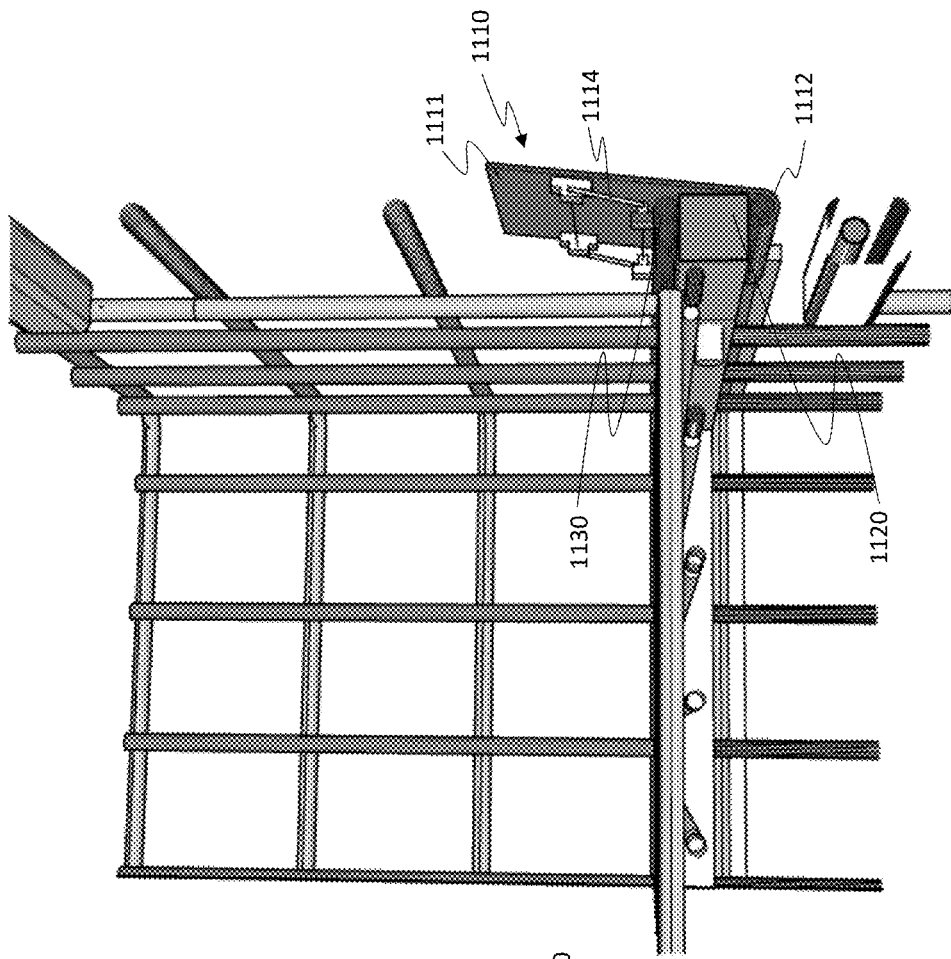
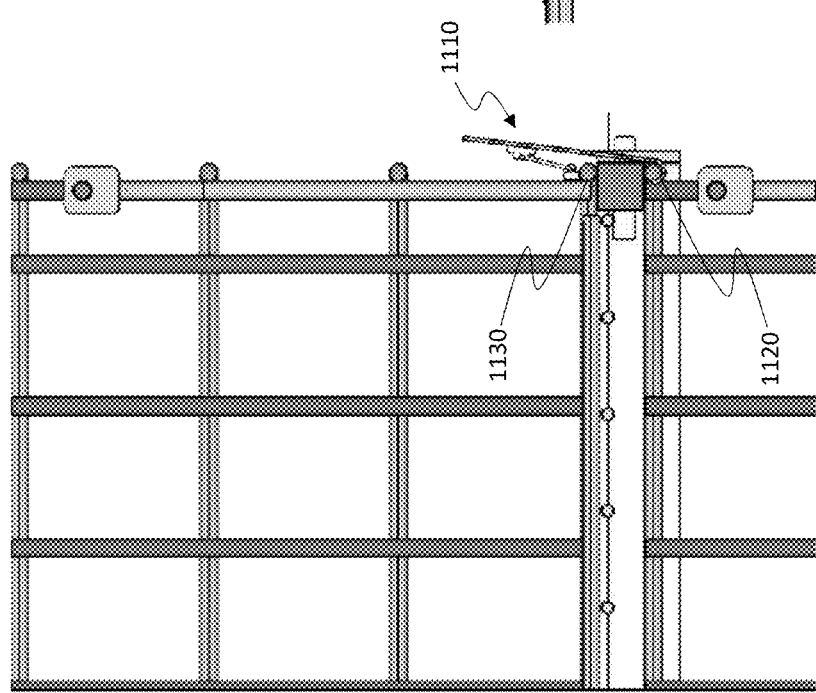
Figure 12B
Figure 12A

PERSONAL SHOPPING CART AND METHOD OF USE

CROSS-REFERENCE TO RELATED APPLICATIONS

This application is a continuation of U.S. patent application Ser. No. 18/157,091, filed on 2023 Jan. 20, which is a continuation application of U.S. patent application Ser. No. 16/987,315, filed on 2020 Aug. 6, now U.S. patent Ser. No. 11/590,995, which claims priority to Provisional Patent Application Ser. No. 62/883,981, filed on 2019 Aug. 7, the entire contents of which is expressly incorporated herein by reference.

STATEMENT RE: FEDERALLY SPONSORED RESEARCH/DEVELOPMENT

Not Applicable

BACKGROUND

When purchasing shopping items from a store, shopping items are typically transported from one compartment to another. For example, a purchaser typically rolls a shopping cart around a store, placing the shopping items in a basket of the shopping cart. The purchaser then rolls the shopping cart to a purchasing station and places the shopping items on a movable belt which then advances towards a checkout machine to inventory the purchases. The shopping items are then typically placed in bags, which are then placed back into the shopping cart which is rolled to a vehicle. The shopping bags containing the shopping items are then moved from the shopping cart to the vehicle for transport. The inconvenience of this system is compounded by the fact that many stores no longer provide shopping bags, requiring a purchaser to first transport shopping bags from the vehicle to the shopping cart before collecting the shopping items within the shopping cart.

There is a need for improved systems and methods for transporting shopping items to minimize the movement of shopping items from one compartment or shopping bag to another.

BRIEF SUMMARY

A modular shopping cart is disclosed having a bottom basket and one or more upper baskets. The bottom basket has a plurality of side walls and a bottom wall to form a compartment which can hold shopping items. The bottom basket has a plurality of wheels that extend downwardly to allow the shopping cart to roll around in a store, such as a grocery store. Modular shopping carts with baskets that can be taken apart and put back together allow a user to use the same shopping cart baskets to store shopping containers in their vehicle, to form a shopping cart for use in a store, to separate shopping items in different sections during shopping, to easily deposit shopping items in a checkout area for a shopping transaction, to easily store the shopping items in a vehicle, and to easily transport the shopping areas from their vehicle to their home.

An upper basket of the modular shopping cart can have a plurality of side walls and a bottom wall to form a compartment which can hold shopping items. A portion of the bottom wall of the upper basket could be configured to fold to define an access pathway between the upper and lower sides of the upper basket, allowing a user to access the bottom basket via the access pathway. The upper baskets could be stacked on top of one another, allowing a user to access the bottom basket via a plurality of access pathways. In a preferred embodiment, at least two upper baskets are stacked above the bottom basket, forming stacked top, middle, and bottom baskets. The bottom wall of an upper basket preferably has one or more panels that are pivotally attached to a lower edge portion of the upper basket, allowing a portion of the bottom wall to fold upwards to be parallel with a side wall in a retracted position, and substantially perpendicular with the side wall in a deployed position. One or more locks could be used to lock portions of the bottom wall in either the retracted or deployed position.

Each of the upper baskets are preferably removably engageable to a lower basket via an attachment mechanism to hold the baskets in place relative to one another, such that when the baskets are engaged to one another, pushing horizontally on the uppermost basket causes the bottom basket to roll along the plurality of wheels.

Each of the baskets could be fabricated from any suitable material, such as metal, plastic, carbon fiber, wood, or combinations thereof. The baskets could be sized and shaped to be any suitable position. A width of each of the baskets is preferably equal to, or at most, a width of a conveyor belt in a cashier's aisle of a grocery store, such as 18 inches.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1A is a front perspective view of an exemplary modular shopping cart.

FIG. 1B is a side plan view of the modular shopping cart of FIG. 1A.

FIG. 1C is a front plan view of the modular shopping cart of FIG. 1A.

FIG. 1D is a rear plan view of the modular shopping cart of FIG. 1A.

FIG. 4A is a front cross-sectional plan view of the top basket of the shopping cart of FIG. 1A having a false bottom right side in a deployed position.

FIG. 4B is a front perspective cross-sectional view of the top basket of FIG. 4A.

FIG. 5A is a front cross-sectional plan view of the top basket of FIG. 4A having a false bottom right side in a partially raised position.

FIG. 5B is a front perspective cross-sectional view of the top basket of FIG. 5A.

FIG. 7B is a cross-sectional plan view of the modular shopping cart of FIG. 7A along the cross-sectional marker.

FIG. 7C is a cross-sectional perspective view of the modular shopping cart of FIG. 7A along the cross-sectional marker.

FIG. 11A is a top plan view of the modular shopping cart of FIG. 1A having a first cross-sectional line (1) and a second cross-sectional line (2).

FIG. 12A is a side plan view of the modular shopping cart of FIG. 11A along the cross-sectional line (1) with the clamp loosened slightly.

FIG. 12B is a side perspective view of the modular shopping cart of FIG. 12A along the cross-sectional lines (1) and (2).

DETAILED DESCRIPTION

Figure 1F:
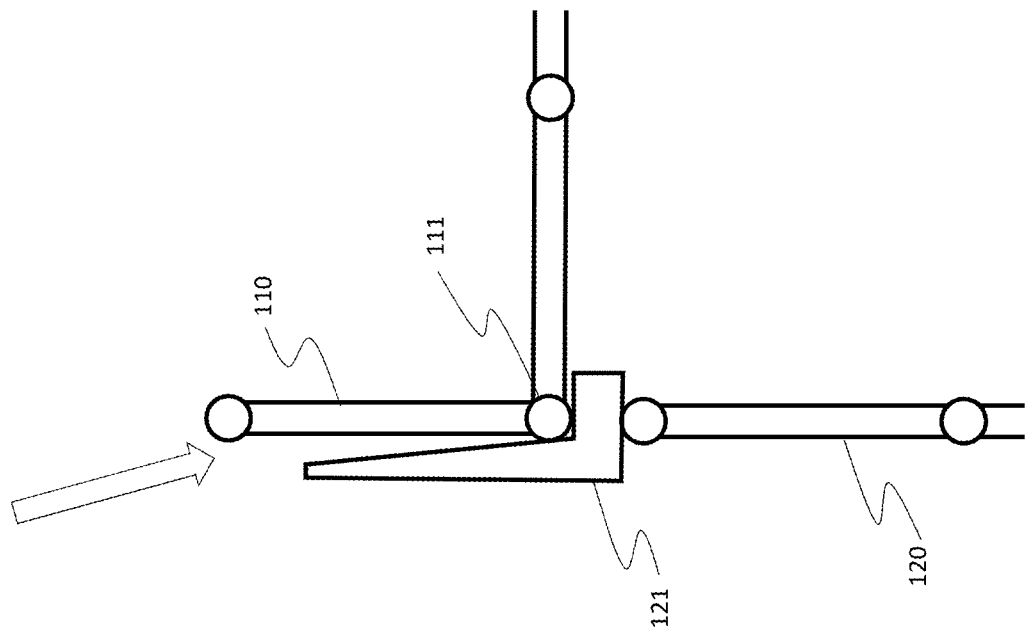
FIG. 1F shows a cross-sectional area of the exemplary lower basket having an upper bracket with the taper and the support with the upper basket lowered into the upper bracket.

Referring now to the drawings, a modular shopping cart 100 is shown in FIGS. 1A-1D having a top basket 110, a middle basket 120, and a bottom basket 130. While only two baskets are shown stacked above bottom basket 130, any suitable number of baskets could be staked on bottom basket 130 and could be used.

The modular shopping cart 100 is shown here in an assembled configuration having top basket 110 coupled to middle basket 120 via clamp 114, and middle basket 120 coupled to bottom basket 130 via clamp 124. While two clamps are used on opposing sides of the baskets to couple one basket to another basket, any number of clamps and/or any other suitable attachment mechanism could be utilized to couple baskets to one another, such as screws, buttons, clamps, and hook and loop fasteners. Attachment mechanisms used to couple one basket to another preferably comprise mechanisms capable of being engaged and disengaged using a hand to allow for a user to easily engage and disengage the baskets from one another without utilizing a tool. Preferably, the attachment mechanisms couple the baskets to one another such that a force directed towards push handle 116 of top basket 110 is transferred through middle basket 120 to bottom basket 130 to move the modular shopping cart 100 along the ground to roll on rear wheels 136 and front wheels 138 of bottom basket 130. Aspects of the disclosed clamps are discussed in more detail below.

Figure 1E:
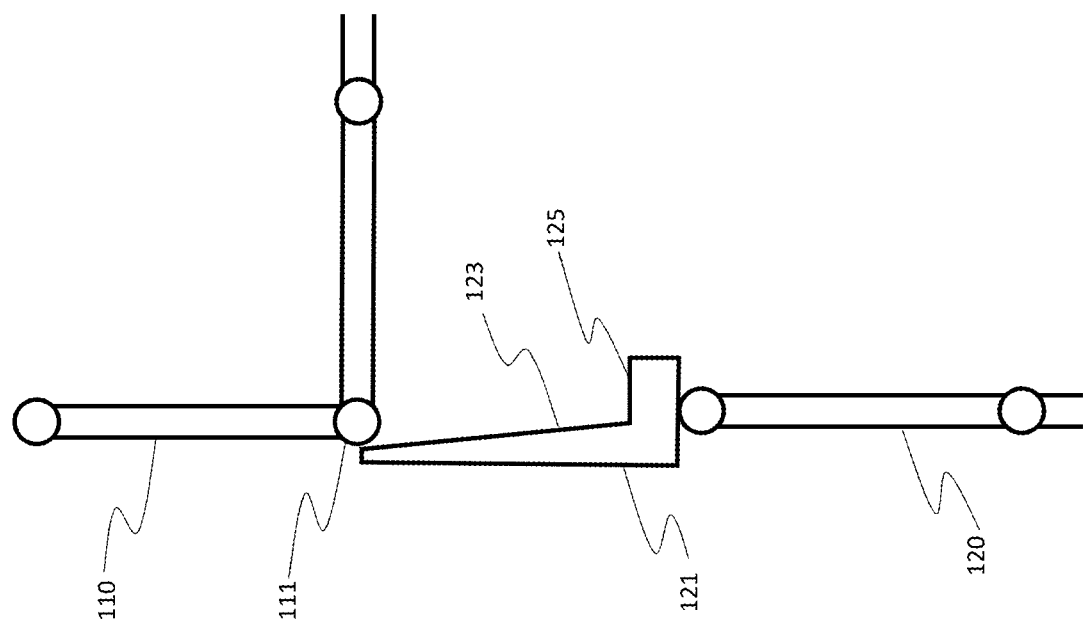
FIG. 1E shows a cross-sectional area of an exemplary lower basket having an upper bracket with a taper and a support with the upper basket in an up position.

While an upper bracket is sized and disposed to fit around and press-fit against an upper perimeter of a lower basket in the embodiments disclosed in FIGS. 1A-1D, a lower perimeter of an upper basket could be sized and disposed to press-fit within an inner-perimeter of a lower bracket as well. In some embodiments, a modular shopping cart could be assembled without the use of clamps at all, where each basket sets on top of one another with a self-adjusting fit, such as the fit between the lower bracket of basket 110 and the upper perimeter of basket 120. In such embodiments, an inner perimeter of an outer lip that accepts an edge of a basket is tapered to allow for self-adjustment. FIGS. 1E-1F shows a cross-sectional area of an exemplary lower basket 120 having an upper bracket 121 with a taper 123 and a support 125. When the upper basket 110 is lowered into upper bracket 121, the lower edge 111 of the upper basket 110 moves inward as it follows the edge of taper 123 to self-align within upper bracket 121, finally coming to rest on support 125 of upper bracket 121.

Rear wheels 136 preferably comprise stationary wheels while front wheels 138 preferably comprise swivel wheels to allow for easier steering of shopping cart 100 by pushing forward on handle 116. More or less wheels could be used, and the wheels could be substantially identical, for example all the wheels could comprise stationary wheels or swivel wheels in other embodiments.

Each of baskets 110, 120, and 130 comprise materials suitable for forming a container within which shopping items can be placed. The material is preferably rigid enough to allow for a force directed towards push handle 116 of top basket 110 to be transferred through middle basket 120 to provide a pushing force on bottom basket 130, allowing modular shopping cart 100 to roll on rear wheels 136 and front wheels 138. Any portion of baskets 110, 120, and 130 could be fabricated from metal, plastic, carbon fiber, wood, or combinations thereof, and preferably are arranged in a fenced grid having at least one side wall and one bottom wall. In rectangular embodiments, the basket preferably has four side walls. As shown, the four walls form a rectangular prism having an upper periphery and a lower periphery to form a container. While the dimensions of the upper and lower peripheries are shown as having substantially the same dimensions, other shapes could be utilized having upper and lower peripheries of differing dimensions, for example an upper periphery having a length longer than a lower periphery, or vice-versa, trapezoidal peripheries having non-parallel opposing sides, or even hexagonal or pentagonal peripheries. Here, the lower periphery is surrounded by a bracket of larger dimensions, forming a recess within which the upper periphery of the lower basket can be placed. Preferably, the bracket is tapered to allow for self-alignment of the basket as it is placed within the recess of the lower bracket. The bracket could be coupled to the lower periphery of the side walls in any suitable manner, for example via screws, clamps, or welding.

In some embodiments, handle 116 could comprise an attachment mechanism that couples to the top basket 110, such that handle 116 is detachable for ease of transport. In other embodiments, handle 116 could be retractable and could slide in and out between an engaged position and a disengaged position. In still other embodiments, top basket 110 could lack a separate handle completely, and could be gripped along an upper edge of top basket 110. In embodiments where top basket 110 lacks a handle, top basket 110 and middle basket 120 could be identical and fungible. In other embodiments, an edge of top basket 110 could comprise a grip, such as a rubber grip molded over an edge of top basket 110, which could act as a handle integrated into the top edge of top basket 110.

Figure 2B:
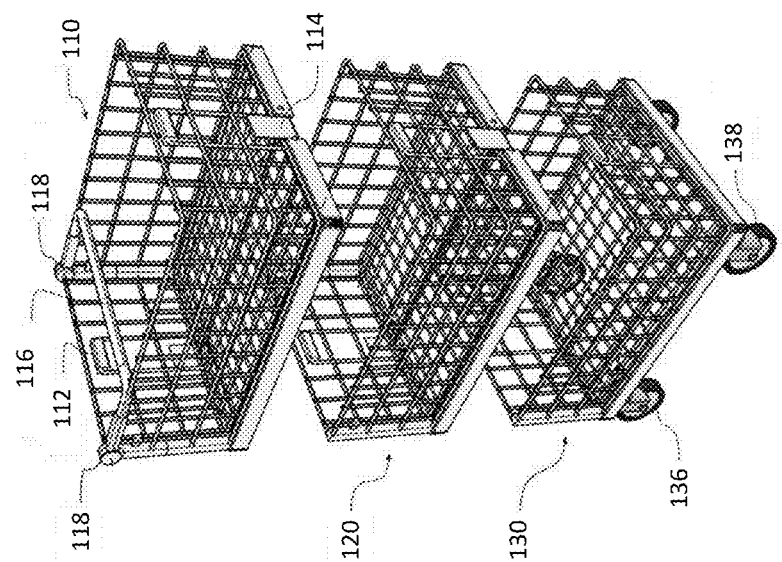
FIG. 2B is an exploded perspective view of the modular shopping cart of FIG. 1A.
Figure 2A:
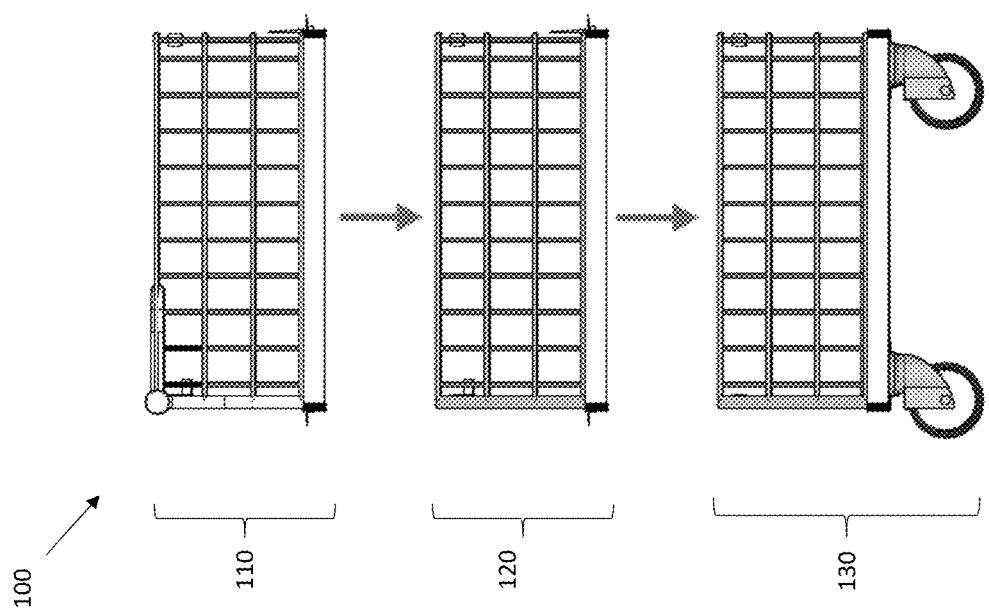
FIG. 2A is an exploded side plan view of the modular shopping cart of FIG. 1A.

FIGS. 2A and 2B illustrate exploded views of modular shopping cart 100, having each of top basket 110, middle basket 120, and bottom basket 130 detached from one another. When in a detached configuration, top basket 110 could be lifted by a user via lift handles 112, middle basket 120 could be lifted by a user via lift handles 122, and bottom basket 130 could be lifted by a user via lift handles 132. The lift handles allow for a user to easily grasp and lift each basket when modular shopping cart 100 is in a disassembled configuration. Lift handles 112, 122, and 132 could comprise any suitable material used for a handle, such as metal, plastic, wood, rubber or combinations thereof, but preferably comprise a rectangular thermoplastic wrapped around bars of opposing side walls of shopping cart 100 to provide a comfortable grip for a user lifting the basket. In some embodiments, each handle could be coupled to a pivoting bar that allows the opposing handles to touch one another so that the basket can be carried in one hand of a user.

As shown, a bracket surrounds the lower periphery of each of the side walls of baskets 110, 120, and 130, allowing for the upper periphery of the brackets to self-align within the brackets when a user assembles modular shopping cart 100. In preferred embodiments, the bracket could be tapered from a larger lower periphery to a smaller upper periphery to assist in self-alignment of the baskets relative to one another. While the embodiment in FIGS. 2A and 2B show the rear wheels 136 and front wheels 138 affixed to the base of bottom bracket 130 (e.g. using screws or welding), the wheels could be coupled to a separate base, such as wheel base 340 shown in FIGS. 3A and 3B.

Figure 3B:
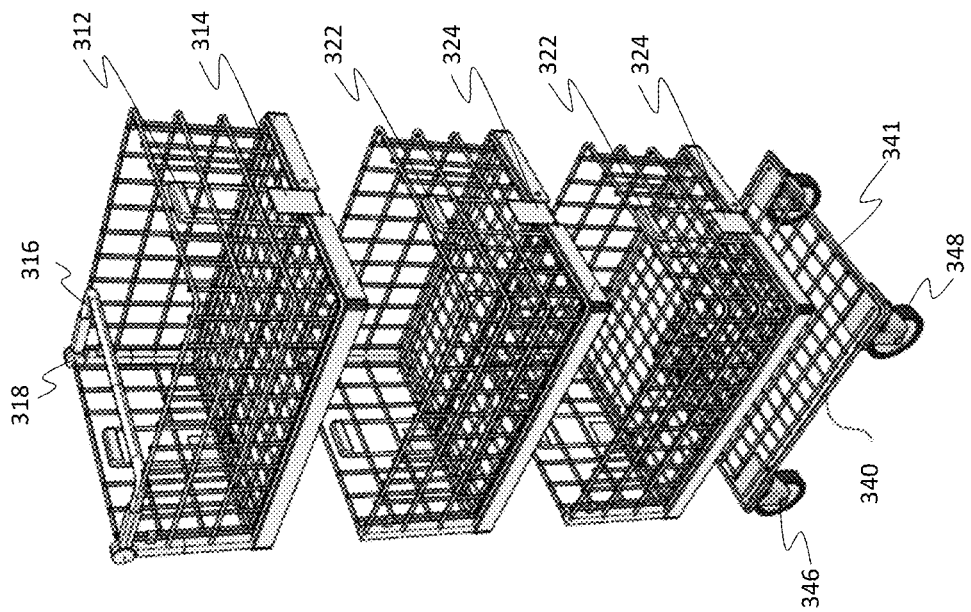
FIG. 3B is an exploded perspective view of the modular shopping cart of FIG. 3A.
Figure 3A:
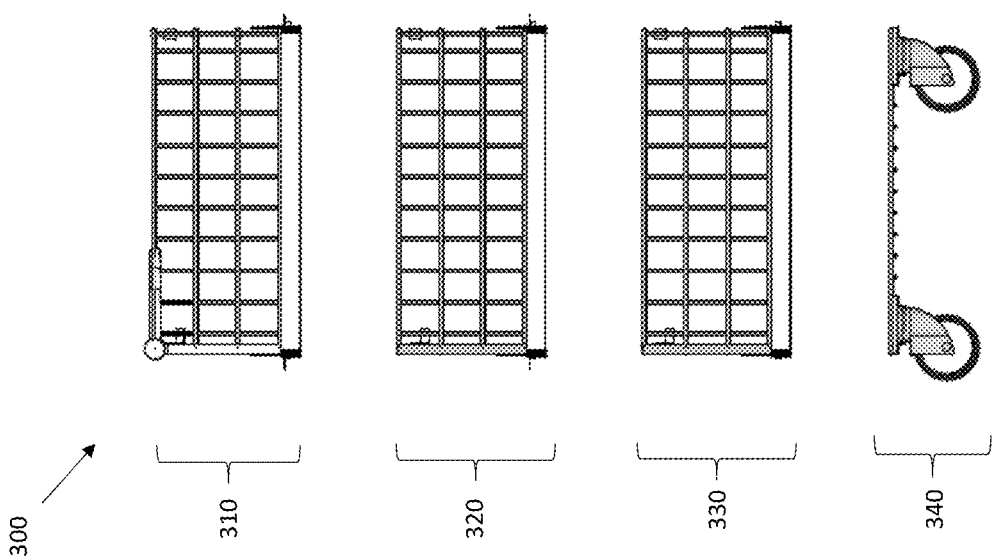
FIG. 3A is an exploded side plan view of an alternative modular shopping cart.
Figure 6B:
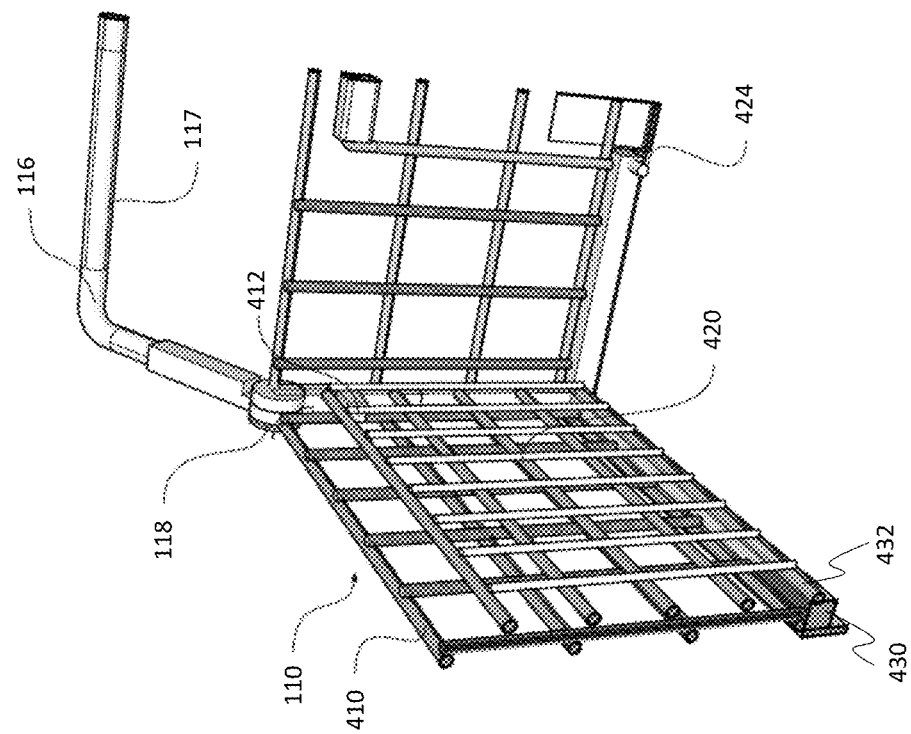
FIG. 6B is a front perspective cross-sectional view of the top basket of FIG. 6A.
Figure 6A:
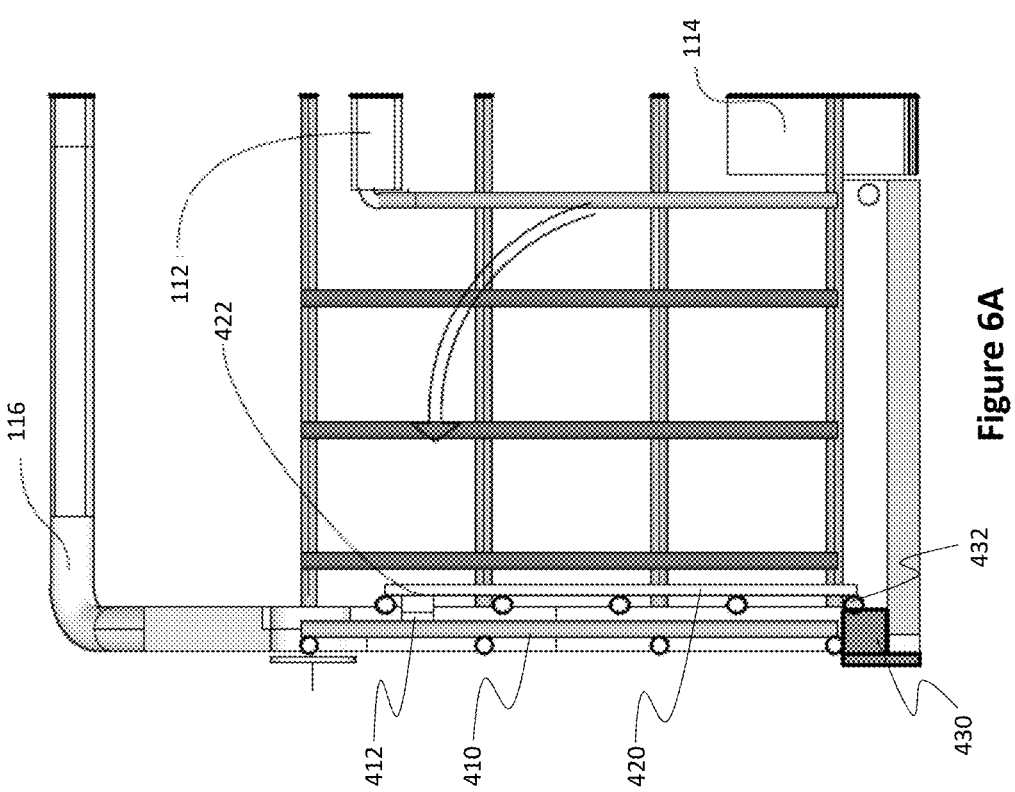
FIG. 6A is a front cross-sectional plan view of the top basket of FIG. 4A having the false bottom right side in a retracted position.

FIGS. 3A and 3B illustrate an alternative embodiment of a modular shopping cart 300 having top basket 310, middle basket 320, bottom basket 330, and wheel base 340. Wheel base 340 comprises an upper grating 341 that is affixed to rear stationary wheels 346 and front swiveling wheels 348. In some embodiments, wheel base 340 could have a visual indicator, such as a color marker, or a mechanical indicator, such as a recess that mates with a projection of bottom basket 330, to ensure that wheel base 340 is not coupled to bottom basket 330 backwards. In other embodiments, each of the wheels of wheel base 340 could comprise swiveling wheels so that wheel base 340 does not have a designated "front."

In alternative embodiments, bottom basket 330 could comprise a bottom wall that opens similarly to middle basket 320. In such embodiments, middle basket 320 and bottom basket 330 would both be substantially identical and can be fungible with one another during assembly, allowing bottom basket 330 to be assembled on top of middle basket 320, which is then assembled on top of wheel base 340. Such embodiments allow fungible "kits" to be manufactured comprising top basket 310, wheel base 340, and any number of middle baskets 320 to be interposed between the two. While middle basket 320 and bottom basket 330 are shown as having substantially identical dimensions, the baskets could be configured to have different heights, allowing for a modular shopping cart to comprise multiple modular baskets of differing sizes for differing needs. For example, top basket 110 could be sized and disposed to be taller than middle basket 120, which could be sized and disposed to be taller than bottom basket 130.

Elements of the bottom wall of top basket 110 and middle basket 120 are shown in more detail in FIGS. 4A, 4B, 5A, 5B, 6A, and 6B, which illustrate that the bottom wall of top basket 110 and false bottom right side 420. False bottom right side 420 is shown in a deployed position in FIGS. 4A and 4B, having a stationary magnet 412 attached to the side wall and a false bottom magnet 422 attached to false bottom right side 420. False bottom right side 420 is rotatably coupled to bottom edge 430 via pivot point 432, shown as a pivoting hinge that allows false bottom right side 420 to fold upwards, shown in FIGS. 5A and 5B, until false bottom right side 420 is substantially parallel to right side wall 410 of top basket 110 in the retracted position, shown in FIGS. 6A and 6B. When false bottom right side 420 is rotated to the retracted position in FIGS. 6A and 6B, stationary magnet 412 engages with false bottom magnet 422 to hold false bottom right side 420 in place until a user applies force to separate the two.

While stationary magnet 412 and false bottom magnet 422 are both shown as magnets, either element could be replaced with a ferrous material, for example a material comprising iron or steel. In other embodiments, right side wall 410 could comprise a ferrous material, allowing false bottom magnet 422 to engage directly with basket side wall 410 without the need of stationary magnet 412. In preferred embodiments, false bottom magnet 422 engages with a flat surface having a surface area at least 80% of the size of false bottom magnet 422 when in the retracted position to increase the magnetic hold of false bottom magnet 422.

While magnets are used to hold false bottom right side 420 in the retracted position, any attachment mechanism could be used, for example matching indents and detents, clamps, clasps, and buttons. Preferably, any such attachment mechanisms can be engaged and disengaged with a human hand, allowing for ease of changing positions without using additional hand tools.

Pivot point 432 could comprise any suitable mechanism that allows false bottom right side 420 to rotate relative to right side wall 410, for example a hinge that allows for at least 85 or 90 degree movement, or a hinge that allows for at least 175, 180, or even 190 degree movement. When false bottom right side 420 is in the deployed position shown in FIGS. 4A and 4B, false bottom stop 424 prevents false bottom right side 420 from over-rotating. In some embodiments, false bottom stop 424 could be disabled, for example by pulling a pin comprising false bottom stop 424 or by engaging a switch coupled to false bottom stop 424, allowing false bottom right side 420 to rotate to a free-swinging position shown in FIG. 32. This allows for a user to dump shopping items onto a destination, such as a shopping conveyor belt, easily simply by disengaging false bottom stop 424 while top basket 110 is placed above the destination. In other embodiments, false bottom stop 424 could be static, allowing false bottom right side 420 to only be rotated upwards, and not downwards.

Figure 8B:
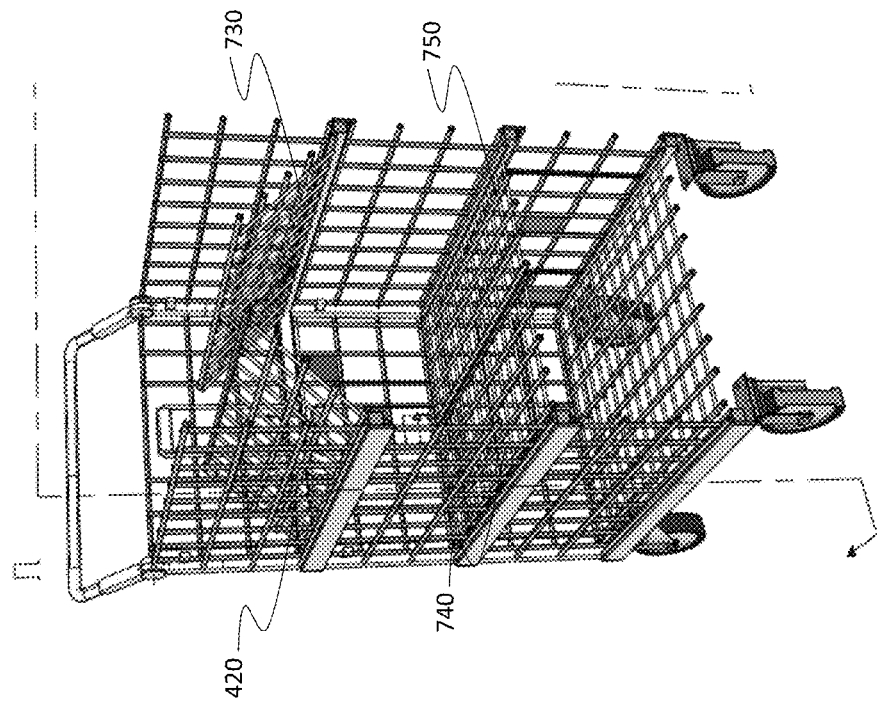
FIG. 8B is a cross-sectional perspective view of the modular shopping cart of FIG. 8A along the cross-sectional marker.
Figure 8A:
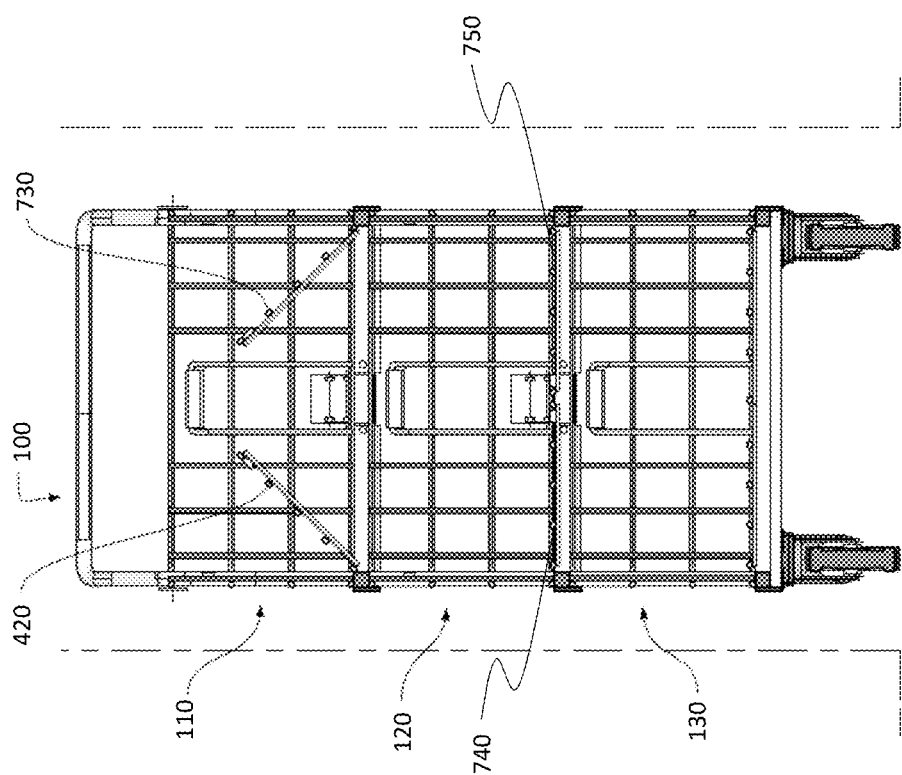
FIG. 8A is a cross-sectional plan view of the modular shopping cart of FIG. 7A along the cross-sectional marker having false bottoms of the top basket in a partially raised position.

Basket 110 preferably has two false bottoms that are mirror images of one another, such as false bottom right side 420 and false bottom left side 730 shown in FIGS. 8A and 8B. While embodiments of baskets having only two false bottoms running perpendicular to the handle are disclosed, a basket could have any number of false bottoms in any suitable configuration, such as one, three, four, or more false bottoms, or two false bottoms running parallel to the handle. Preferably, the false bottoms are rotatably coupled to a portion of the basket to allow the false bottom to fold to a position at least substantially parallel to a side wall, to allow items to travel from a position below the basket to a position between the side walls of the basket.

Figure 7A:
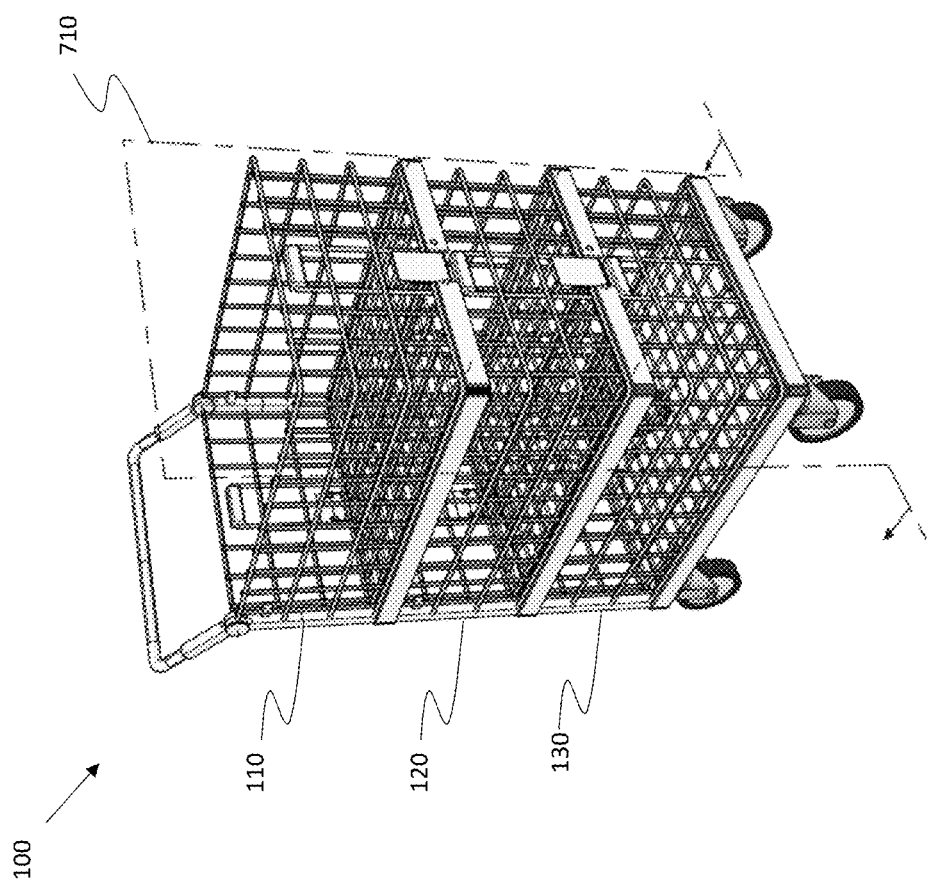
FIG. 7A is a front perspective view of the modular shopping cart of FIG. 1A having a cross-sectional marker having false bottoms of the top basket and the middle basket in engaged positions.

As shown in FIGS. 7A, 7B, 7C, 8A, 8B, 9A, 9B, 10A, 10B, 10C, and 10D, similar false bottoms could comprise the bottom wall of middle basket 120, allowing for a user to access the bottom wall 131 of bottom basket 130 through access pathways through top basket 110 and middle basket 120. In this manner, modular shopping cart 100 could comprise three discrete compartments as shown in FIGS. 7A, 7B, and 7C, two discrete compartments as shown in FIGS. 8A and 8B, or a single compartment as shown in FIGS. 10A, 10B, 10C, and 10D. A user could move the false bottom sides to the side walls from a deployed position to a retracted position and back again to alter the configuration of modular shopping cart 100.

Figure 9B:
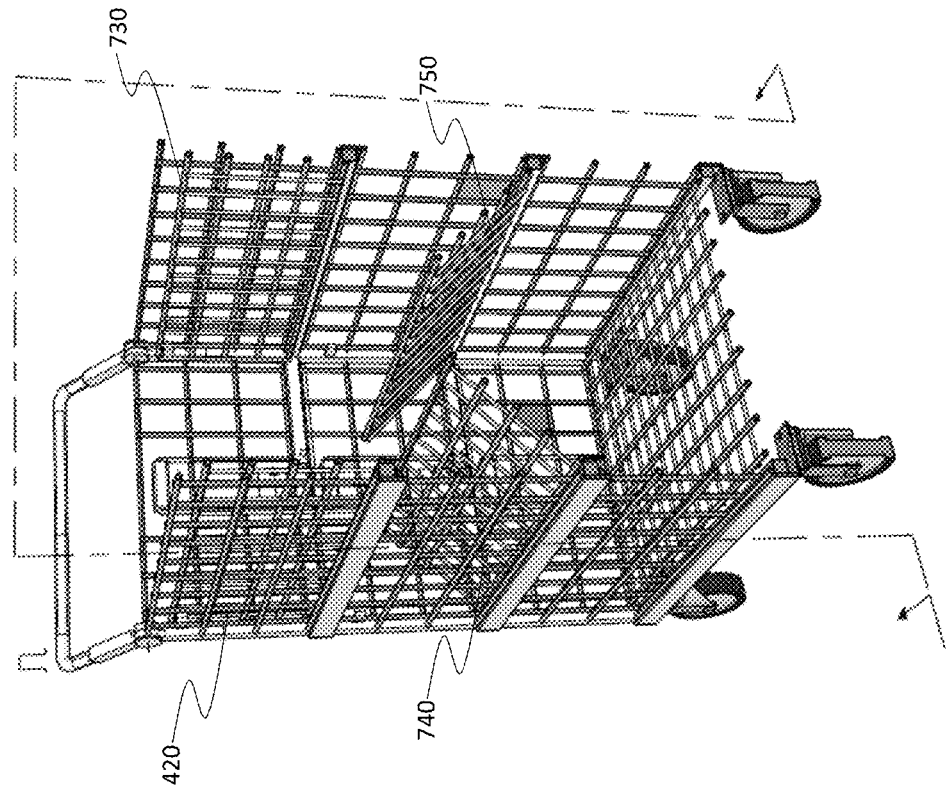
FIG. 9B is a cross-sectional perspective view of the modular shopping cart of FIG. 9A along the cross-sectional marker.
Figure 9A:
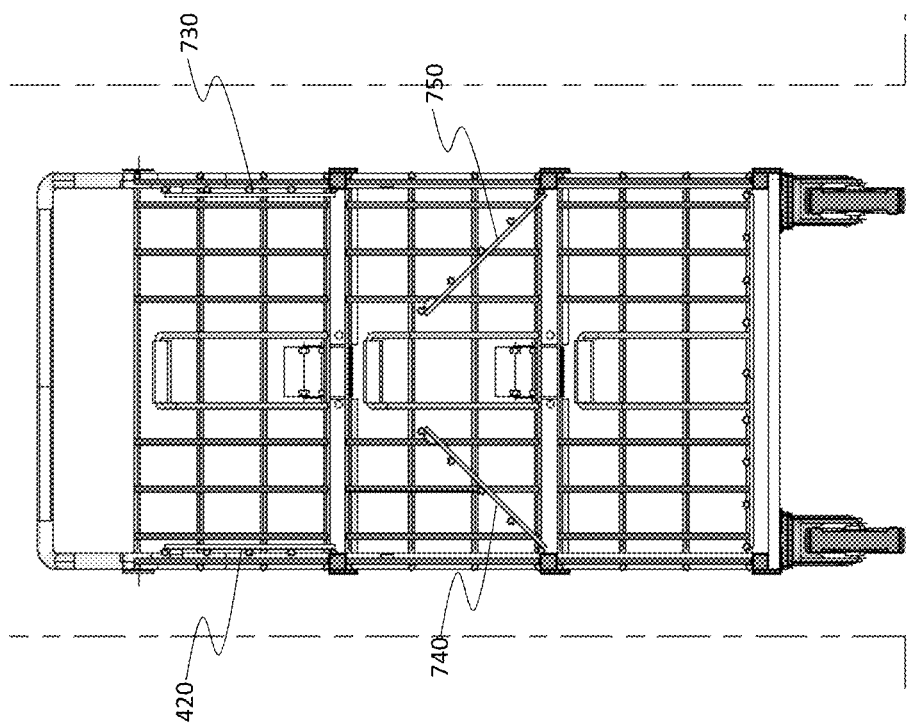
FIG. 9A is a cross-sectional plan view of the modular shopping cart of FIG. 7A along the cross-sectional marker having false bottoms of the top basket in a disengaged position and false bottoms of the middle basket in a partially raised position.
Figure 10B:
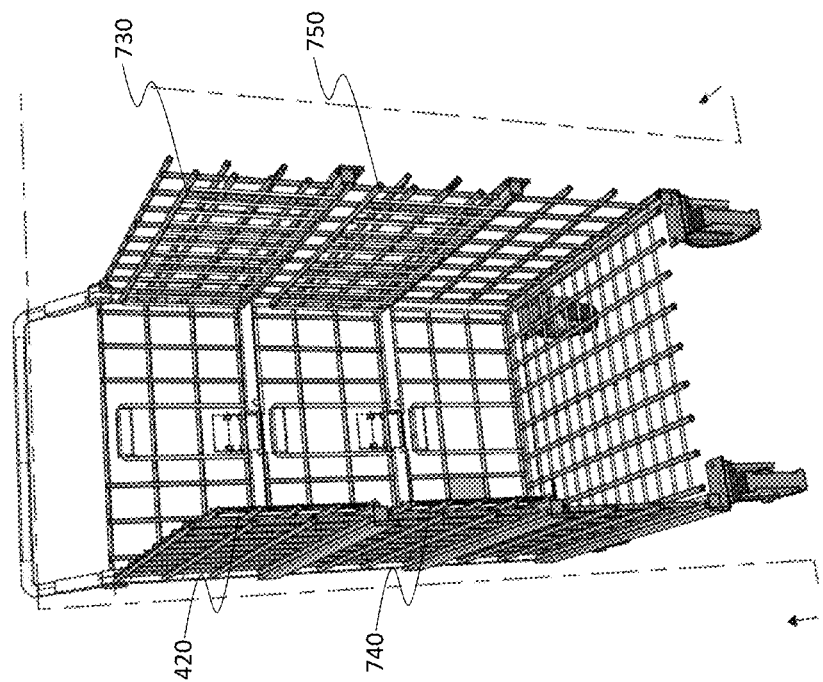
FIG. 10B is a cross-sectional perspective view of the modular shopping cart of FIG. 10A along the cross-sectional marker.
Figure 10A:
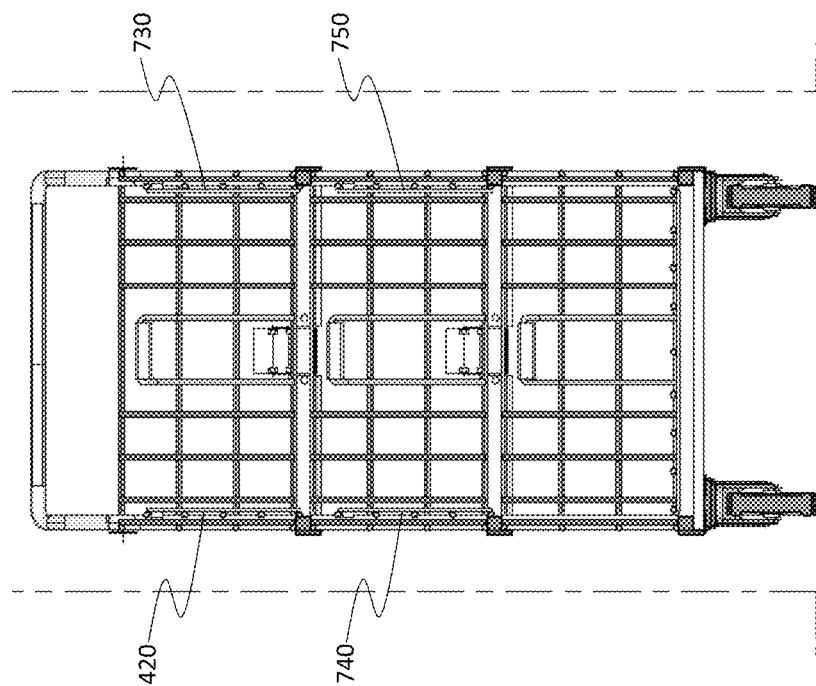
FIG. 10A is a front perspective view of the modular shopping cart of FIG. 7A along the cross-sectional marker having false bottoms of the top basket and the middle basket in disengaged positions.
Figure 10D:
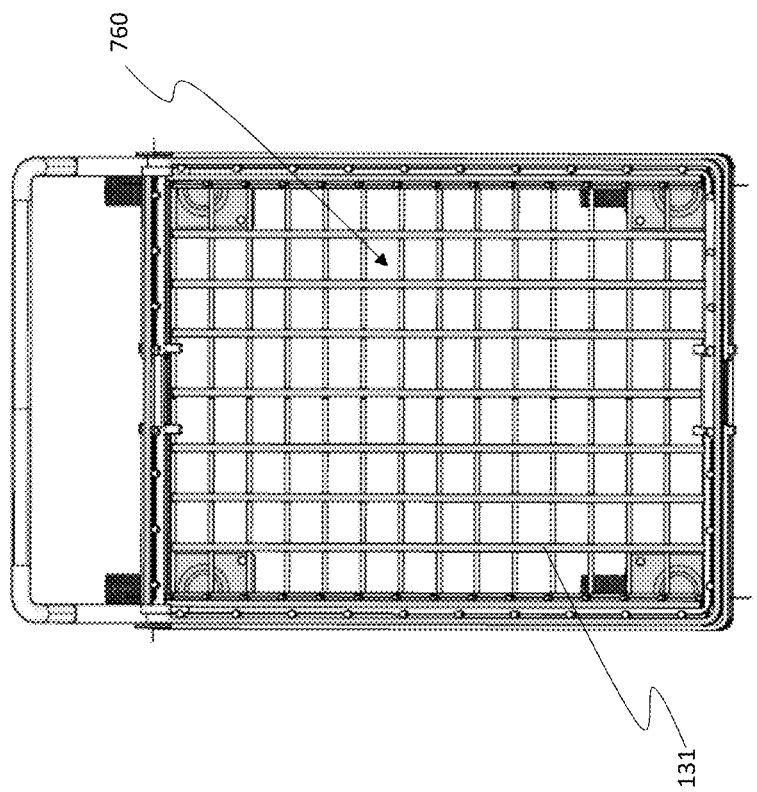
FIG. 10D is a top plan view of the modular shopping cart of FIG. 10A.
Figure 10C:
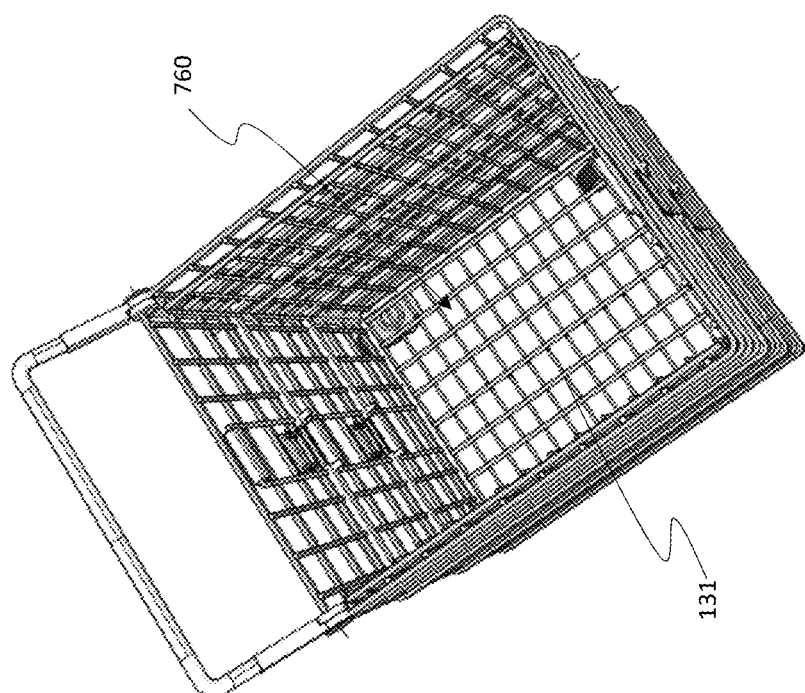
FIG. 10C is a top perspective view of the modular shopping cart of FIG. 10A.

FIG. 7A shows modular shopping cart 100 having three discrete compartments for each of top basket 110, middle basket 120, and bottom basket 130. FIGS. 7B and 7C show alternative views of modular shopping cart 100 in this configuration along cross-sectional line 710. In FIGS. 8A and 8B, a user moves false bottom right side 420 and false bottom left side 730 from a retracted position to a deployed position to open up an access pathway in top basket 110. This allows a user to access the bottom walls (740 and 750) of middle basket 120 through the access pathway through top basket 110. In FIGS. 9A and 9B, the user then moves false bottom right side 740 and false bottom left side 750 from a retracted position to a deployed position to open up another access pathway, this time through middle basket 120. This allows a user to access the bottom wall 131 of bottom basket 130 through access pathways through both top basket 110 and middle basket 120. This configuration with all false bottoms in retracted positions is shown in FIGS. 10A, 10B, 10C, and 10D having main compartment 760.

In some embodiments, a false bottom could comprise a pivot point that is sized and disposed to allow the retracted false bottom to rotate more than 90 degrees to rest against a side wall. Such false bottoms could have a pivot point that is closer to a centerline of the basket, which would create a lip along the bottom edge of the basket that does not retract. Such a false bottom could stay in the retracted position without the need of a latch, and would stay in place via gravitational and friction forces.

Figure 11C:
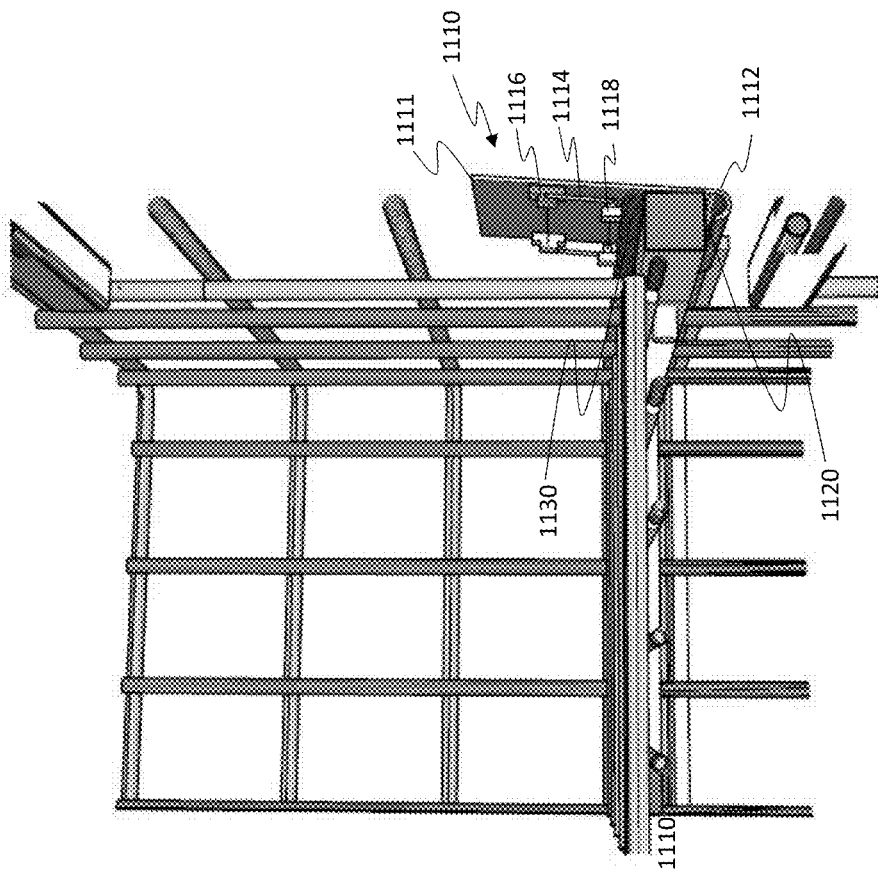
FIG. 11C is a side perspective view of the modular shopping cart of FIG. 11B along the cross-sectional lines (1) and (2).
Figure 11B:
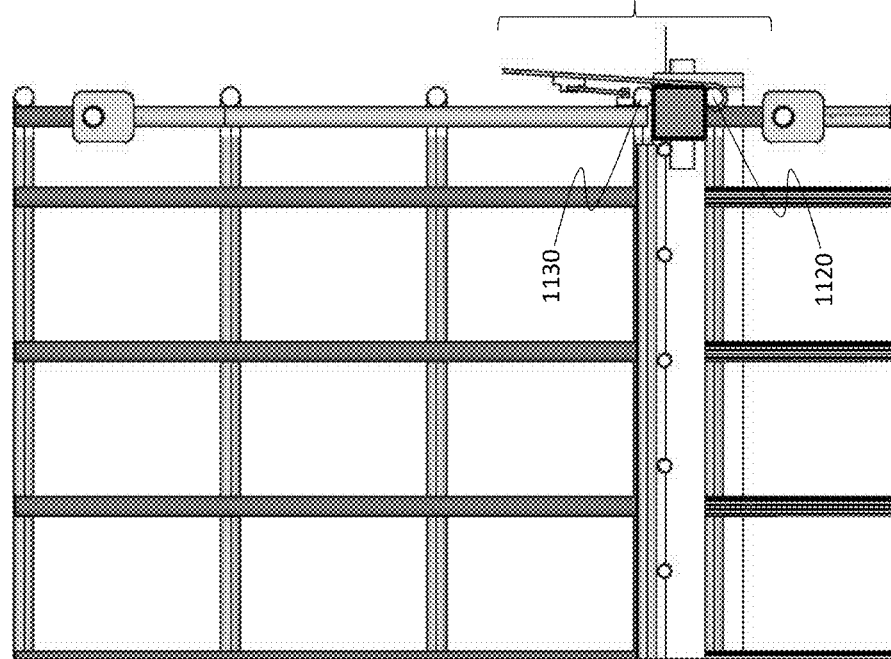
FIG. 11B is a side plan view of the modular shopping cart of FIG. 11A along the cross-sectional line (1).
Figure 13B:
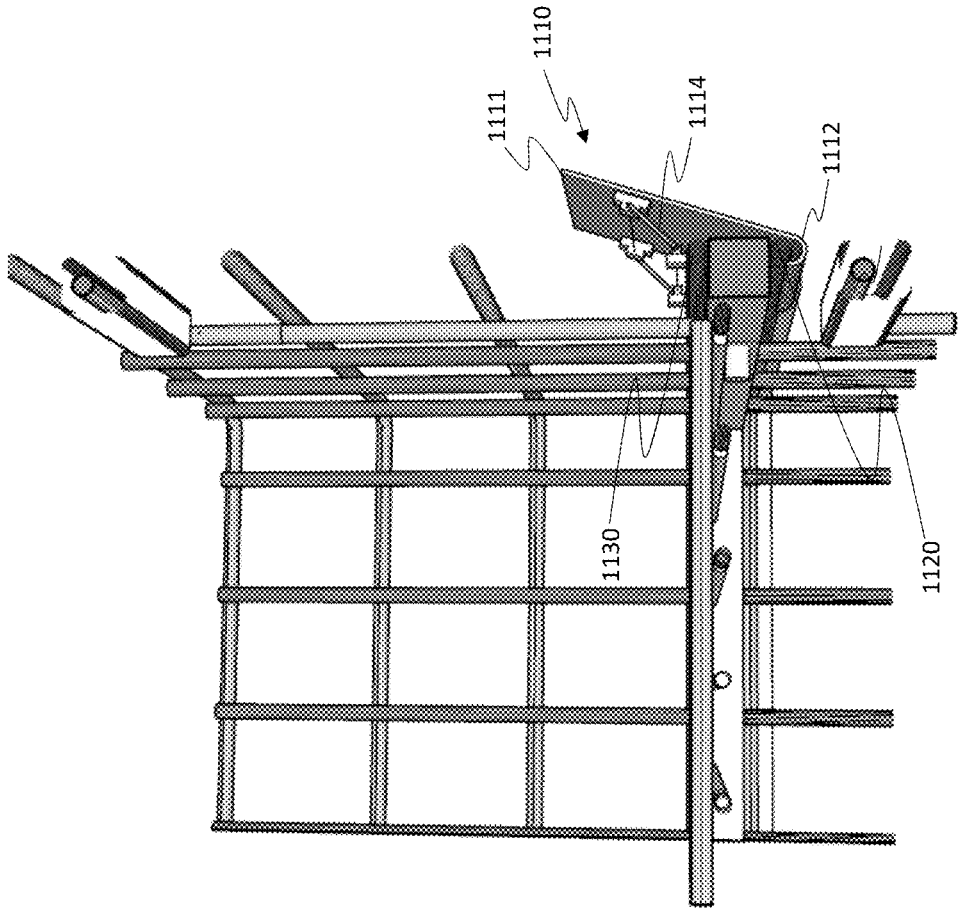
FIG. 13B is a side perspective view of the modular shopping cart of FIG. 12A along the cross-sectional lines (1) and (2).
Figure 13A:
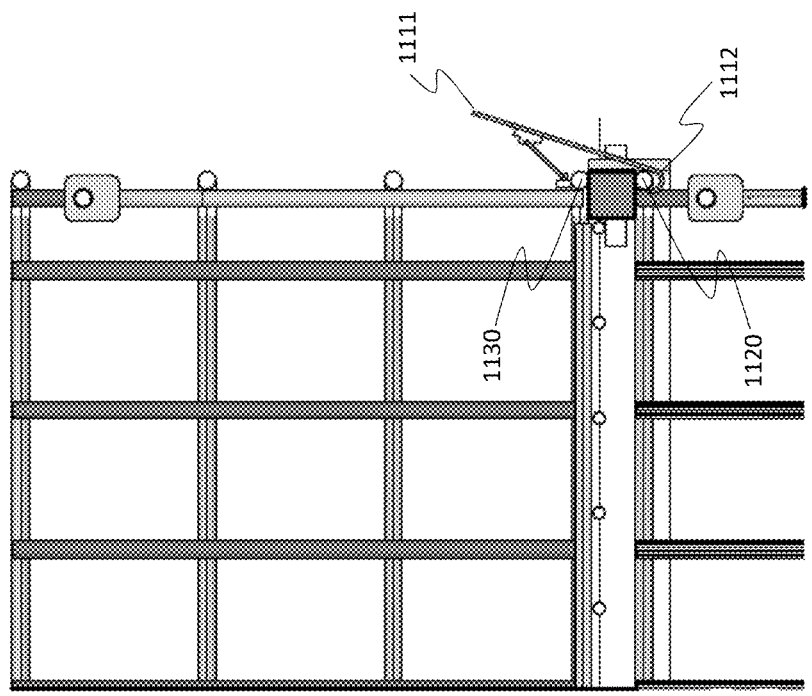
FIG. 13A is a side plan view of the modular shopping cart of FIG. 11A along the cross-sectional line (1) with the clamp loosened fully.
Figure 14B:
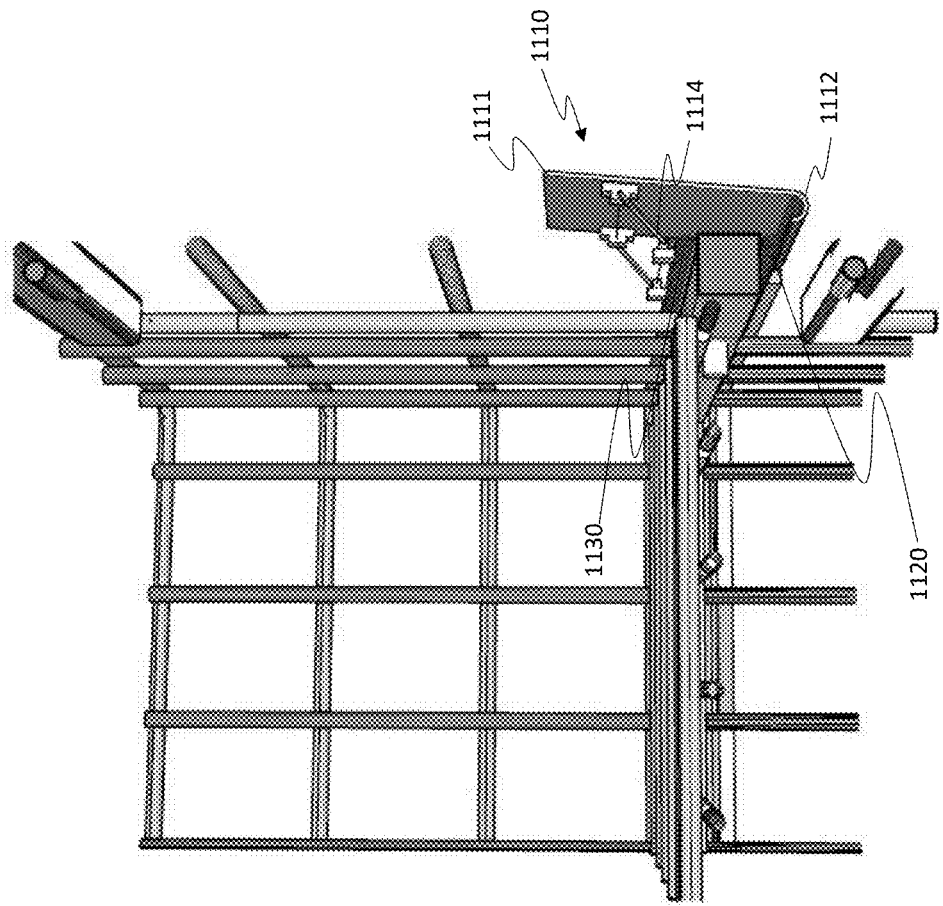
FIG. 14B is a side perspective view of the modular shopping cart of FIG. 12A along the cross-sectional lines (1) and (2).
Figure 14A:
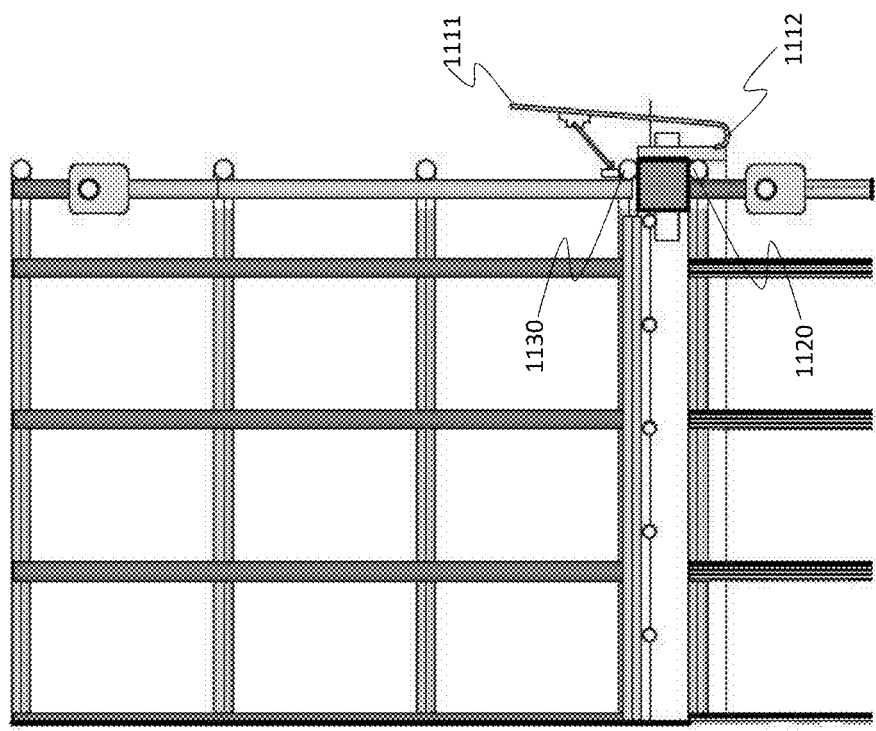
FIG. 14A is a side plan view of the modular shopping cart of FIG. 11A along the cross-sectional line (1) with the clamp disengaged.

FIG. 11A shows a top view of modular shopping cart 100 having two cross-sectional lines, lines (1) and (2), which illustrate the cross-sectional views shown in FIGS. 11B and 11C. FIGS. 11B and 11C show details of draw-down latch 1110 that couples the bottom edge 1130 of top basket 110 with the top edge 1120 of middle basket 120, holding both baskets together when in a stacked formation. Draw-down latch 1110 locks in place by pushing handle 1111 towards the side wall of top basket 110, adding tension to tension bar 1114 coupled to latch attachment 1116 and latch attachment 1118. Latch attachment 1118 is attached to bottom edge 1130, while latch attachment 1116 is coupled to handle 1111. In FIGS. 12A and 12B, a user pushes handle 1111 away from the side wall of top basket 110, decreasing the tension on tension bar 1114, allowing the user to push latch handle 1111 downwards in FIGS. 13A and 13B to disengage hook 1112 from top edge 1120. Hook 1112 could then be moved away from top edge 1120, as shown in FIGS. 14A and 14B, allowing a user to pull handle 1111 upwards to rotate draw down latch 1110 flush against the side of top basket 110 and fully disengage the baskets from one another.

Figure 16:
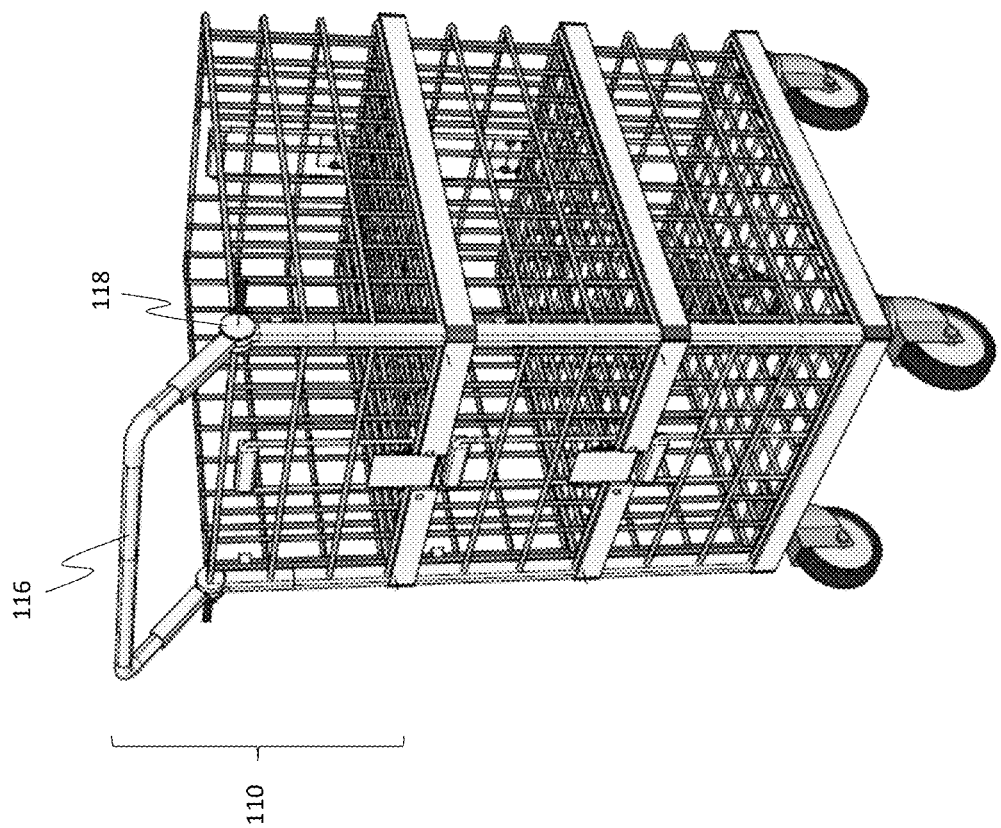
FIG. 16 is a rear perspective view of the modular shopping cart of FIG. 1A with the handle in an obtuse-angled position.
Figure 15:
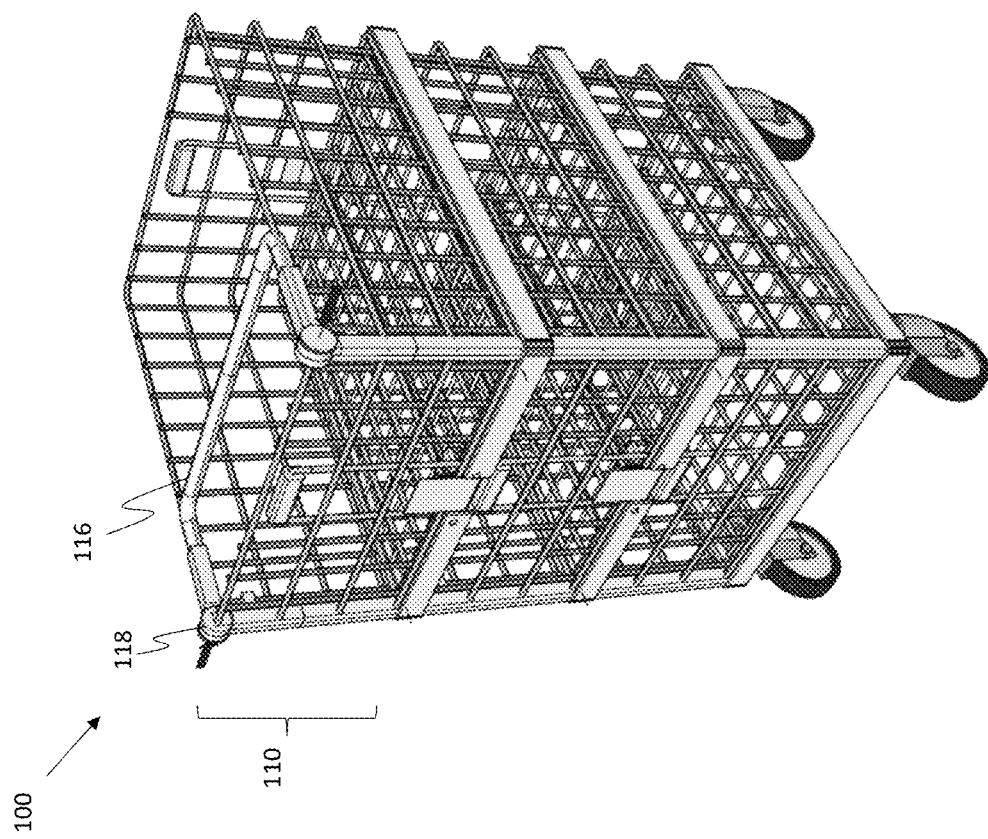
FIG. 15 is a rear perspective view of the modular shopping cart of FIG. 1A with the handle in a horizontal position.
Figure 17B:
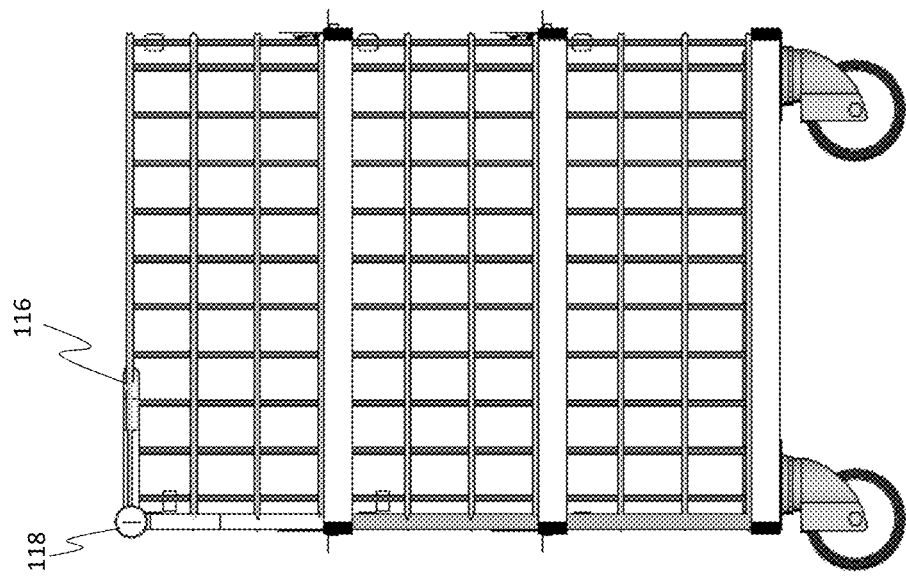
FIG. 17B is a side plan view of the modular shopping cart of FIG. 17A.
Figure 17A:
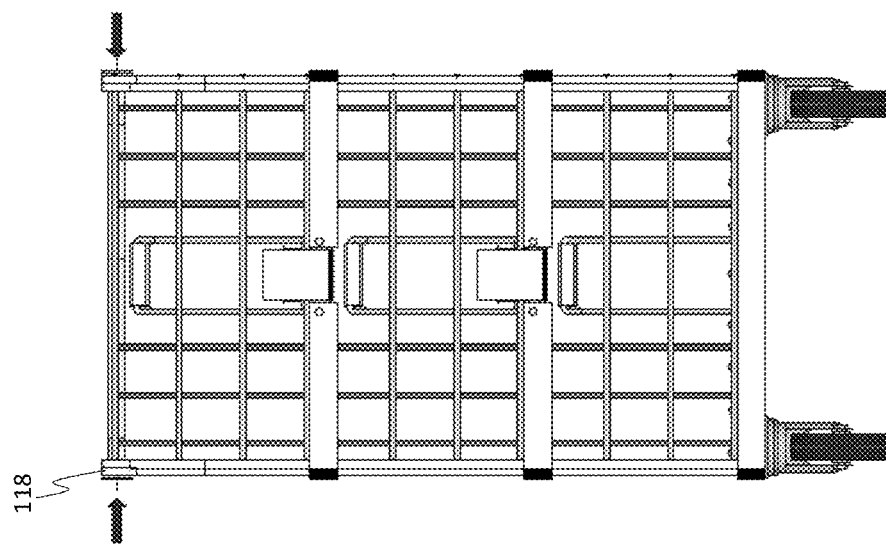
FIG. 17A is a rear plan view of the modular shopping cart of FIG. 1A with the handle in a horizontal position.
Figure 19:
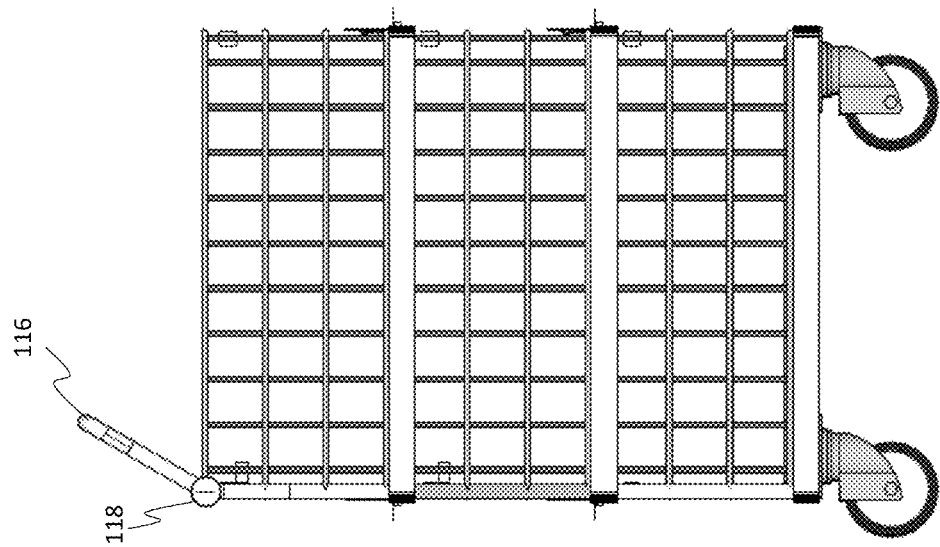
FIG. 19 is a side plan view of the modular shopping cart of FIG. 1A with the handle in another acute-angled position.
Figure 18:
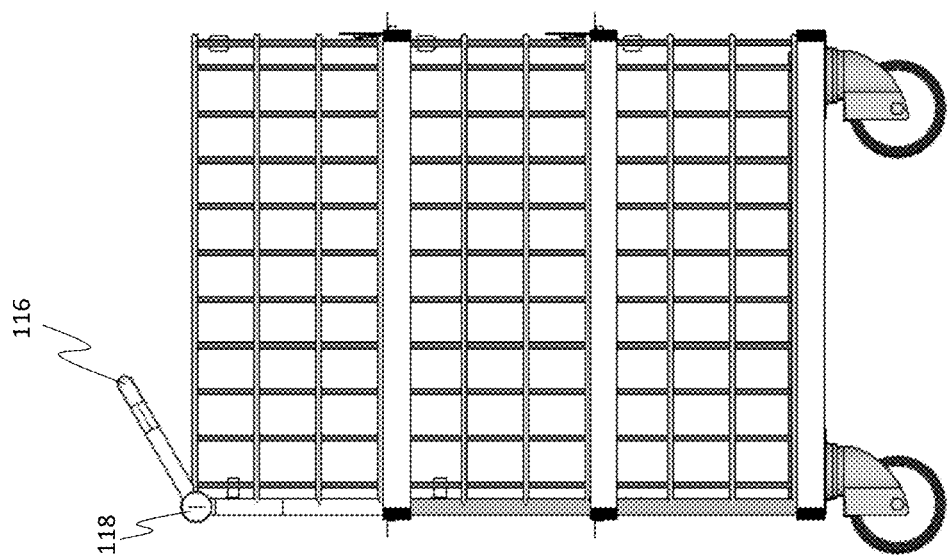
FIG. 18 is a side plan view of the modular shopping cart of FIG. 1A with the handle in an acute-angled position.
Figure 21:
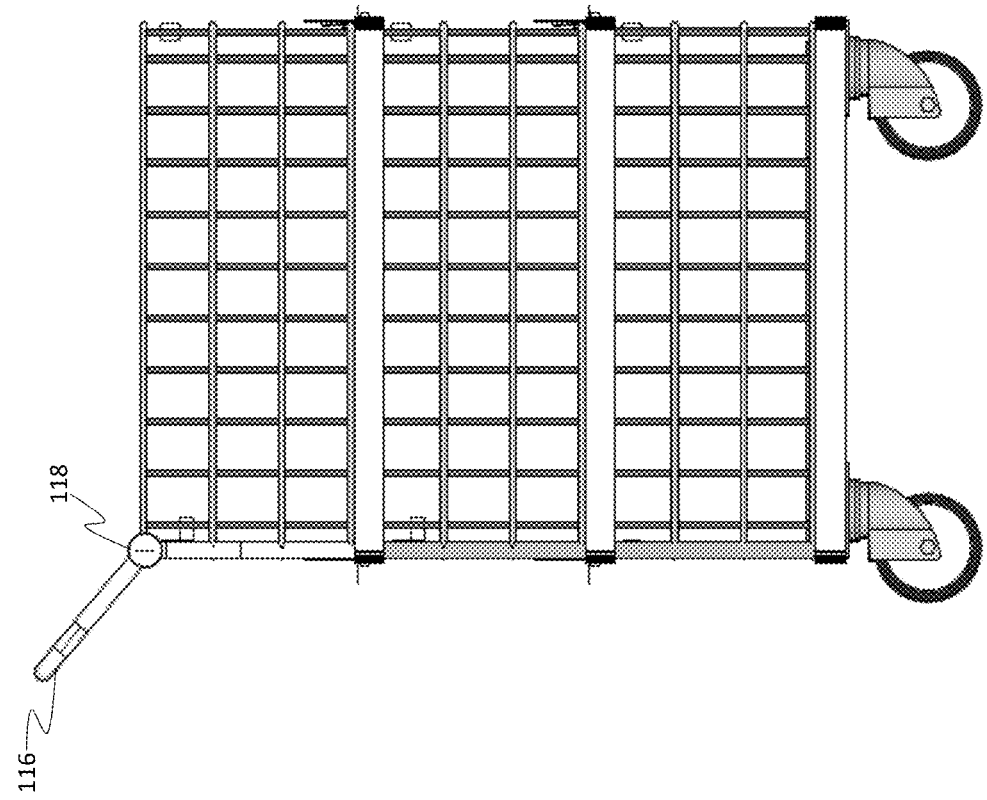
FIG. 21 is a side plan view of the modular shopping cart of FIG. 1A with the handle in an obtuse-angled position.
Figure 20:
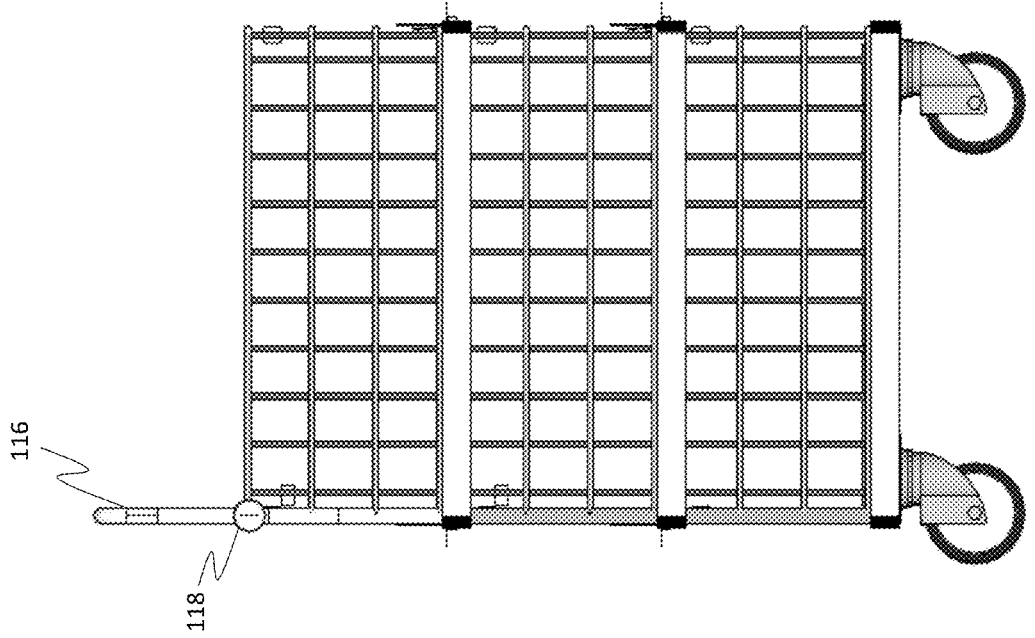
FIG. 20 is a side plan view of the modular shopping cart of FIG. 1A with the handle in a right-angled position.

Handle 116 of top basket 110 is rotatably coupled to top basket 110 via an adjustable locking hinge 118, although other hinges could be used that can be similarly applied. In other embodiments, handle 116 could be configured not to rotate at all. Locking hinge 118 allows handle 116 to rotate between several locked positions, for example the horizontal-angled position shown in FIG. 15 or the obtuse-angled position shown in FIG. 16. Preferably, locking hinge 118 comprises a manual lock that can be engaged or disengaged, allowing a user to rotate handle 116 about locking hinge 118 when the lock is disengaged, and does not allow rotation when the lock is engaged. Exemplary locked positions are shown in FIGS. 17A and 17B, showing handle 116 in the horizontal-angled position, FIG. 18, showing handle 116 in an acute-angled position, FIG. 19, showing handle 116 in another acute-angled position, FIG. 20, showing handle 116 in a right-angled position, and FIG. 20, showing handle 116 in an obtuse-angled position. More or less locked positions could be used in alternative embodiments.

Figure 22A:
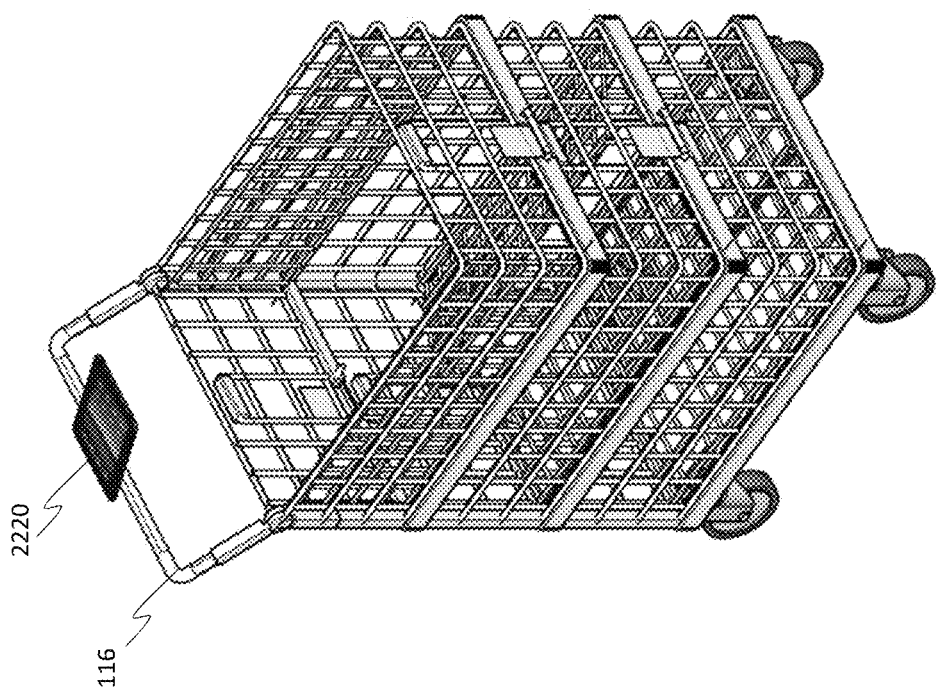
FIG. 22A is a front perspective view of the modular shopping cart of FIG. 1A with a mount for a mobile device.
Figure 22C:
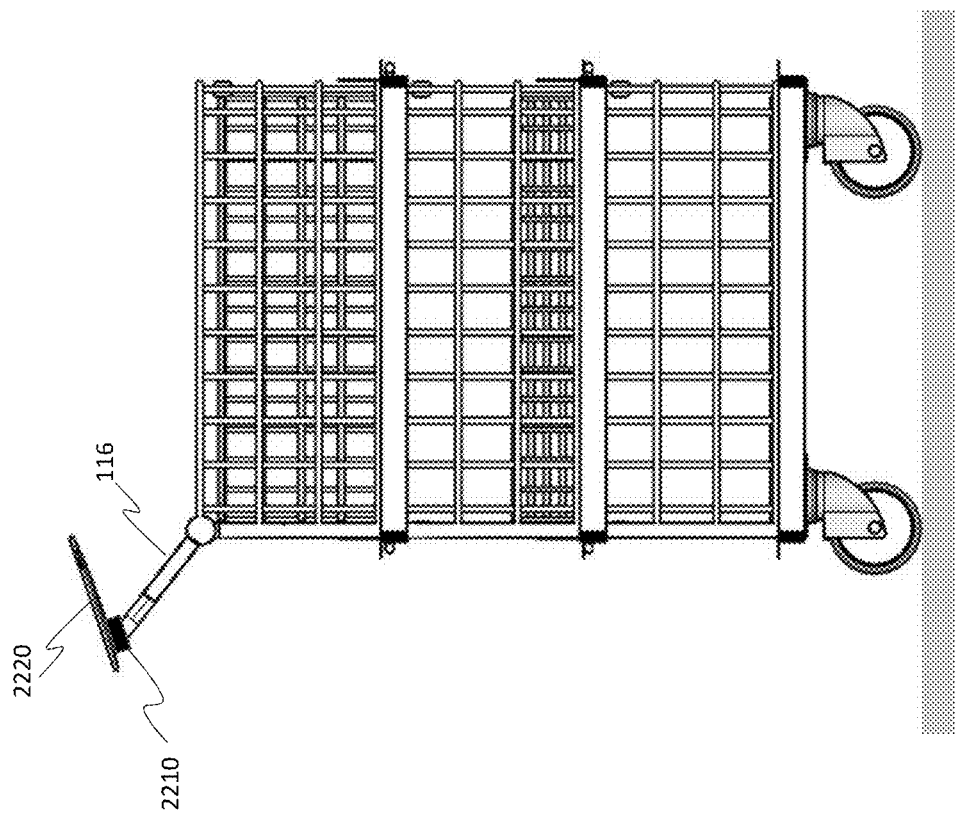
FIG. 22C is a side plan view of the modular shopping cart of FIG. 22A.
Figure 22B:
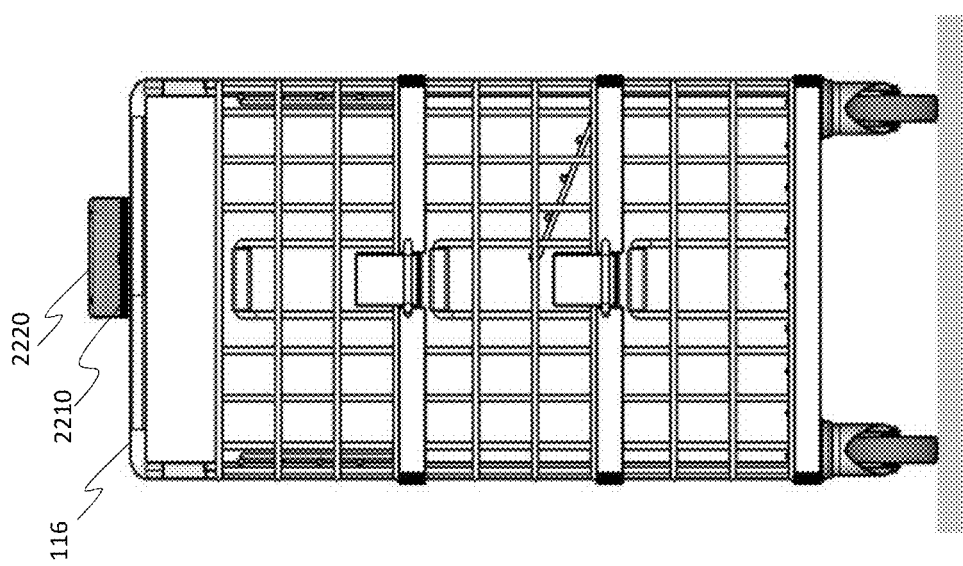
FIG. 22B is a front plan view of the modular shopping cart of FIG. 22A.

An alternative handle 116 is shown in FIGS. 22A, 22B, and 22C, having a mobile device mount 2210 which is configured to hold mobile device 2220 in-place relative to handle 116. Mobile device mount 2210 is shown here as a magnet that couples to a case of mobile device 2220 to hold it in place, although any other suitable device mount could be used, for example an elastic recess that holds a periphery of mobile device 2220, a suction cup, or a clamp.

Hence, modular shopping carts, such as modular shopping carts 100, could be utilized to easily transport shopping items. An exemplary method is explained below.

Figure 23B:
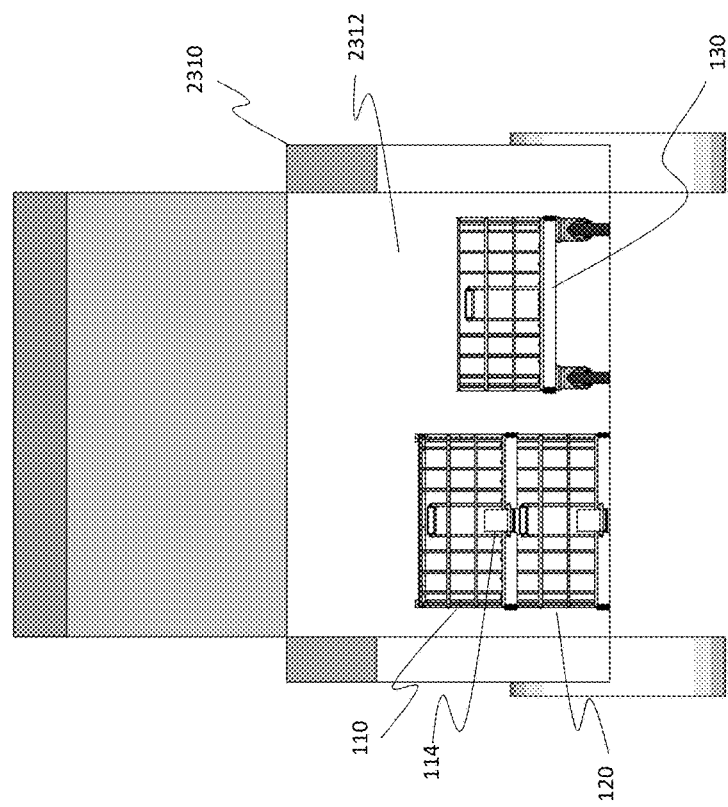
FIG. 23B is a rear plan view of the vehicle of FIG. 23A.
Figure 23A:
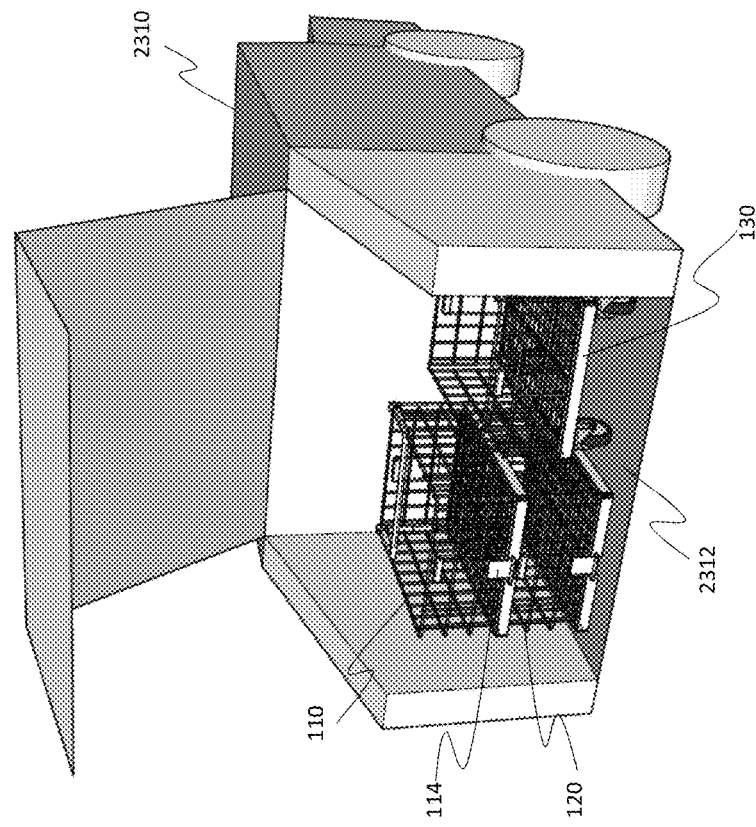
FIG. 23A is a rear perspective view of a vehicle containing the disassembled modular shopping cart of FIG. 22A.

In FIGS. 23A and 23B, vehicle 2310 has a storage space 2312, shown here as a trunk of vehicle 2310, that holds top basket 110, middle basket 120, and bottom basket 130 in the trunk of the car. Handle 116 is shown rotated to the horizontal-angled position, and top basket 110 and middle basket 120 are shown as coupled together via clamp 114. In alternative embodiments, the baskets could fold such that the vertical side walls are parallel to the bottom walls, allowing the baskets to be stored in the vehicle without taking much room.

Figures 24A, 24B:
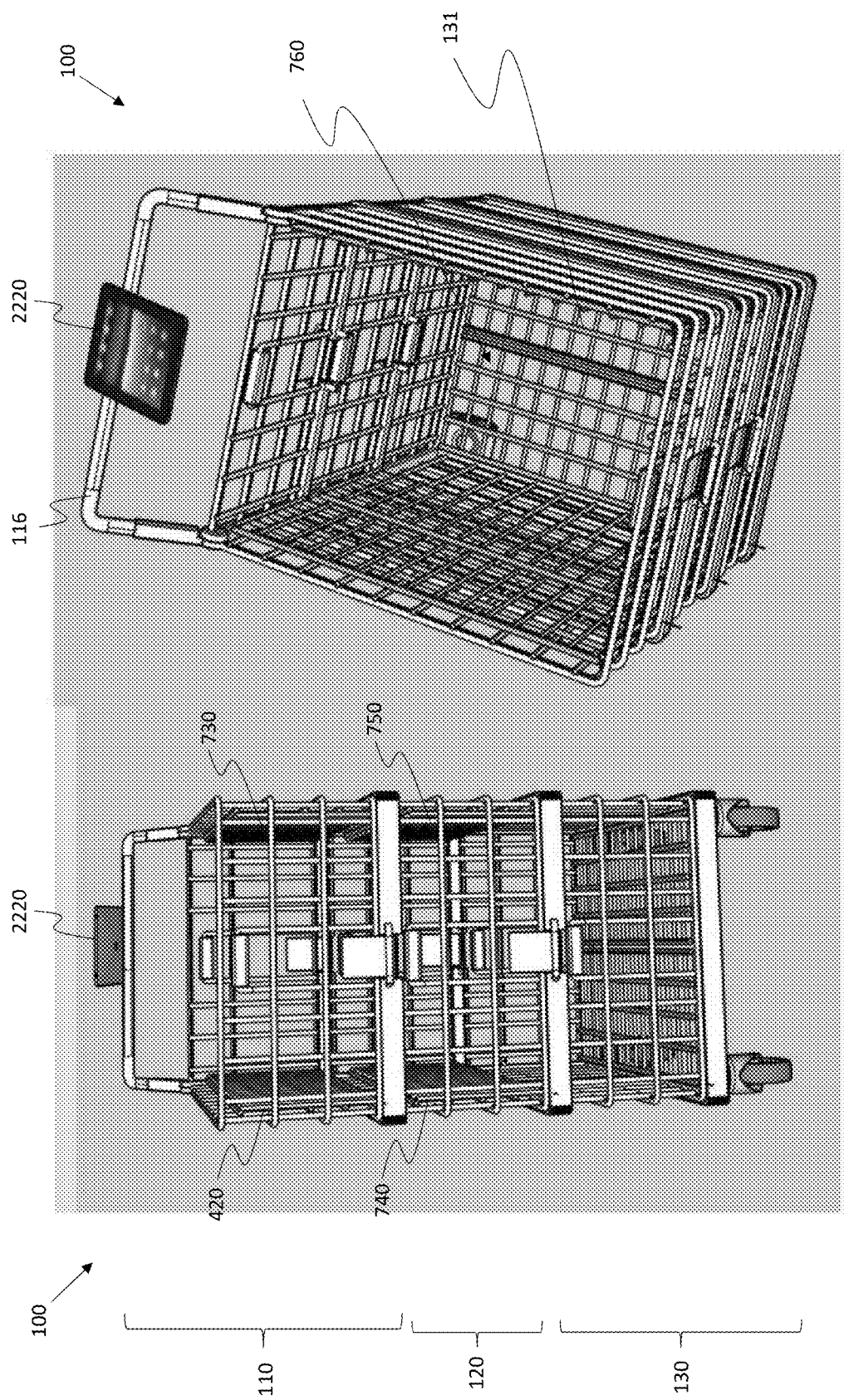
FIG. 24A is a front perspective view of the assembled modular shopping cart of FIG. 23A.
FIG. 24B is a top perspective view of the modular shopping cart of FIG. 24A.

As shown in FIGS. 24A and 24B, a user could then remove the baskets from storage space 2312 and stack the baskets of modular shopping cart 110 to a fully retracted position by placing bottom basket 130 on a flat surface, stacking middle basket 120 on bottom basket 130 and clamping them together using clamp 124, and then stacking top basket 110 on middle basket 120 and clamping them together using clamp 114. False bottom right side 420 and false bottom left side 730 of top basket 110 could then be retracted to open an access pathway through top basket 110, and false bottom right side 740 and false bottom left side 750 of middle basket 120 could be retracted to open an access pathway through middle basket 120. Handle 116 could then be rotated from the horizontal-angled position to an obtuse-angled position, and mobile device 2220 could be coupled to handle 116 via device mount 2210.

Figure 26:
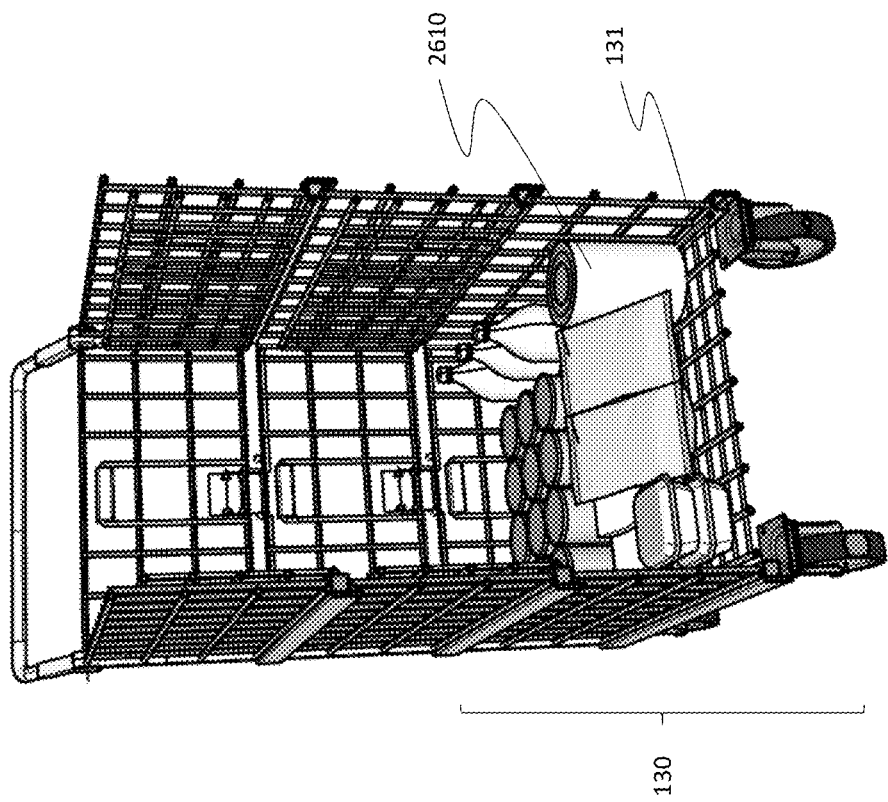
FIG. 26 is a front cross-sectional perspective view of the modular shopping cart of FIG. 25 containing shopping items in the bottom basket.
Figure 25:
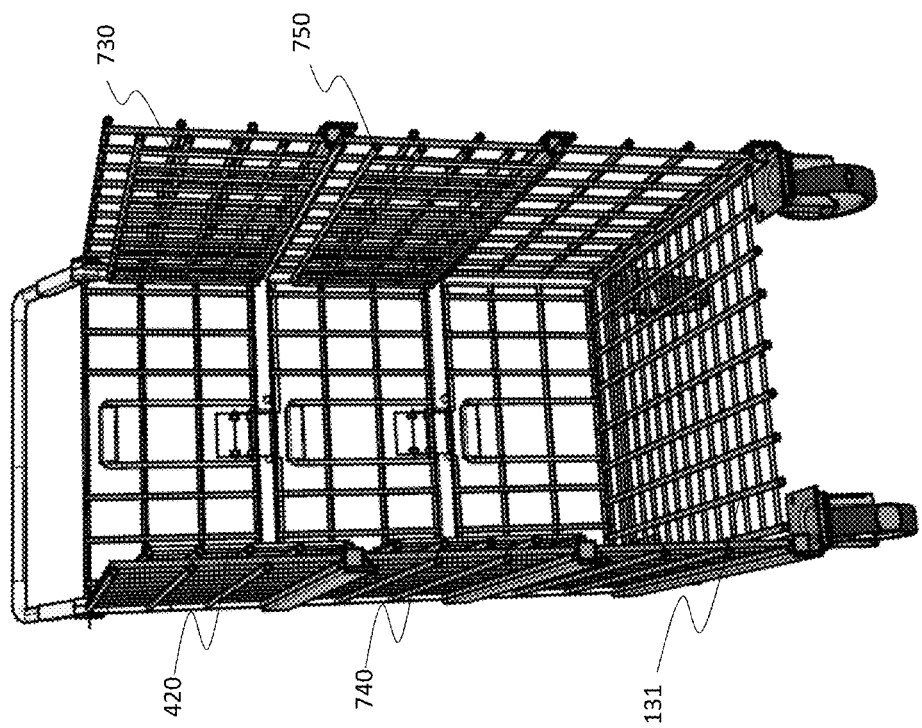
FIG. 25 is a front cross-sectional perspective view of the modular shopping cart of FIG. 24A.
Figure 28:
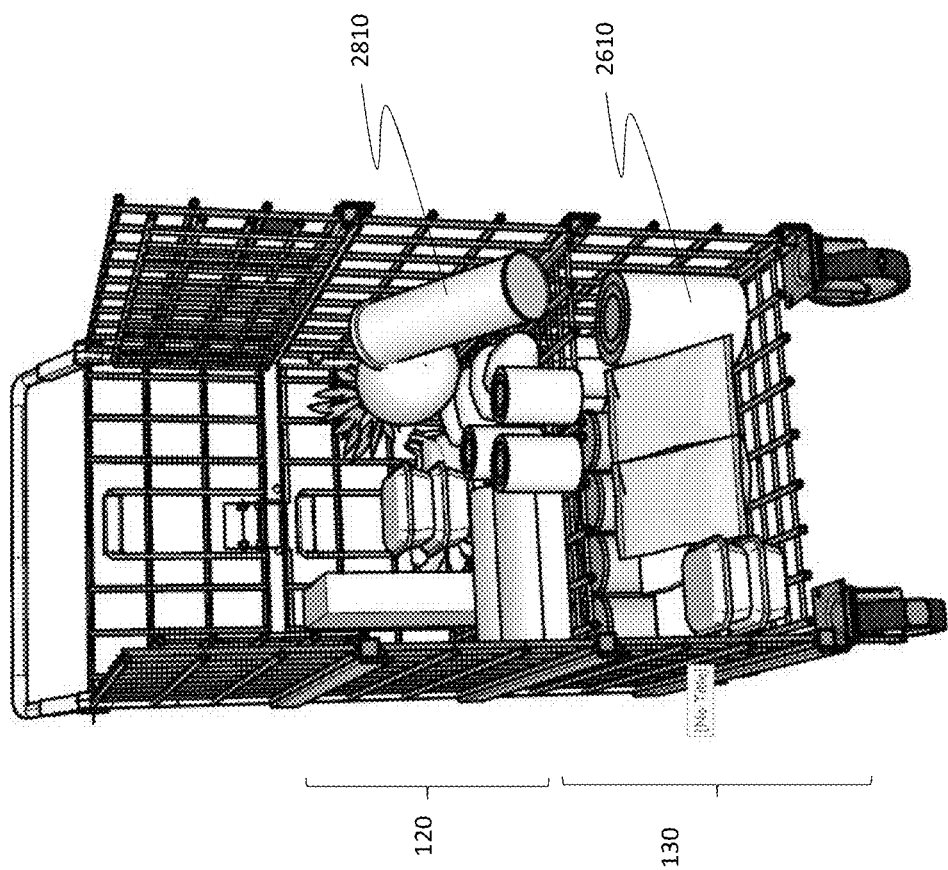
FIG. 28 is a front cross-sectional perspective view of the modular shopping cart of FIG. 27 containing shopping items in the middle basket.
Figure 27:
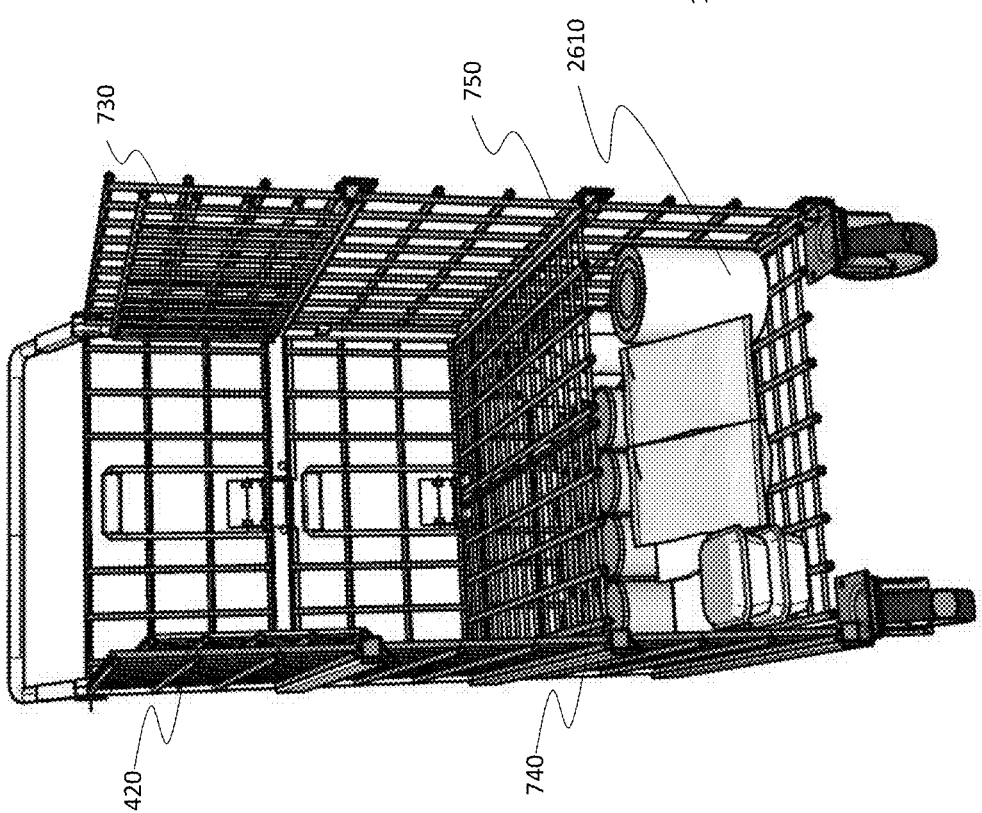
FIG. 27 is a front cross-sectional perspective view of the modular shopping cart of FIG. 26 having false bottoms of the middle basket in an engaged position.
Figure 30:
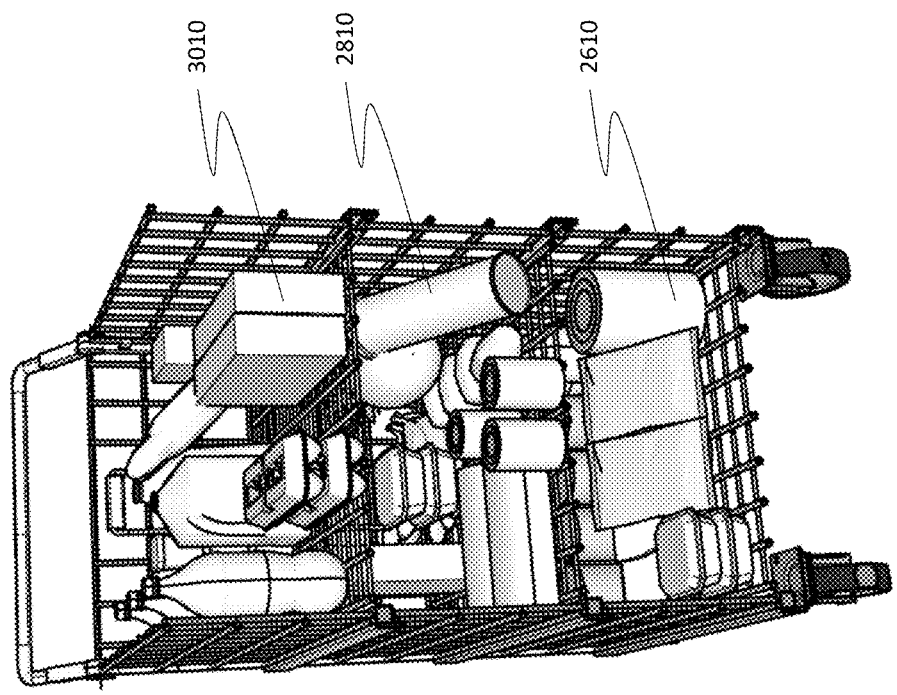
FIG. 30 is a front cross-sectional perspective view of the modular shopping cart of FIG. 29 containing shopping items in the top basket.
Figure 29:
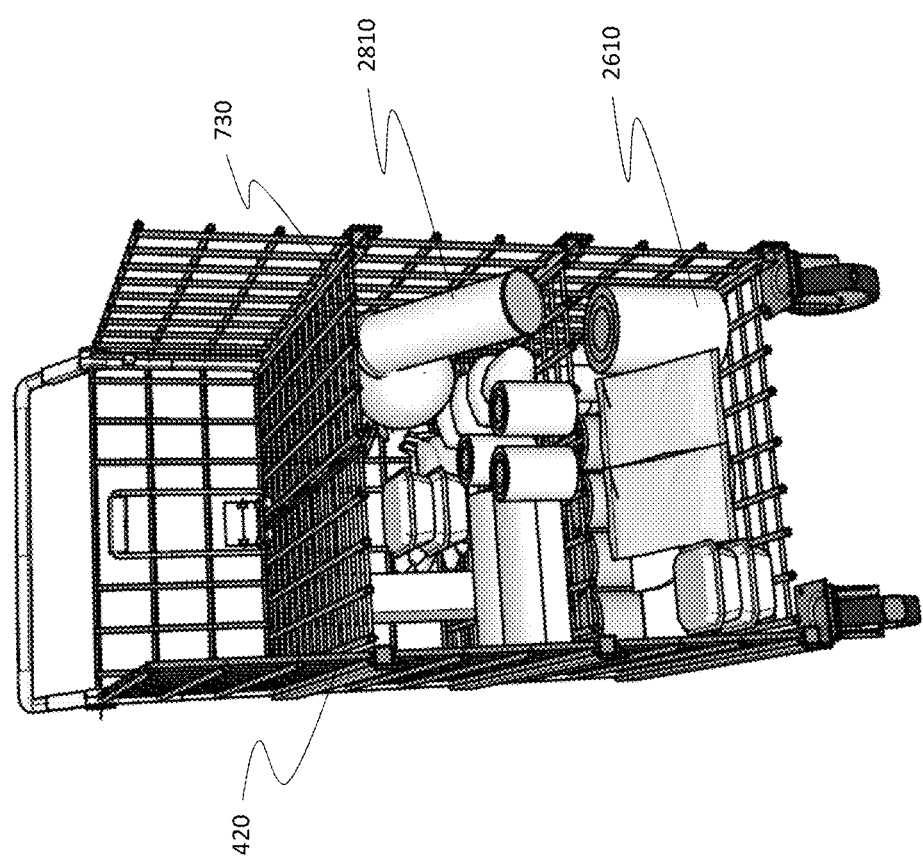
FIG. 29 is a front cross-sectional perspective view of the modular shopping cart of FIG. 28 having false bottoms of the top basket in an engaged position.

A user could then add shopping items to modular shopping cart 110. In some embodiments, shopping items could be piled into the large compartment of modular shopping cart 110 formed by the access pathways through top basket 110 and middle basket 120. In other embodiments, shopping items could be placed in each basket and closed by deploying the false bottoms. For example, in FIG. 26, shopping items 2610 are added to bottom basket 130 by placing them on the bottom wall 131 of bottom basket 130. False right bottom wall 740 and false left bottom wall 750 are then moved from a retracted position to a deployed position in FIG. 27, allowing a user to then place shopping items 2810 into middle basket 120 by playing them on the bottom walls 740 and 750 of middle basket 120, as shown in FIG. 28. False right bottom wall 420 and false left bottom wall 730 of top basket 110 are then moved from a retracted position to a deployed position in FIG. 29, allowing a user to then place shopping items 3010 into top basket 110 by playing them on the bottom walls 420 and 730 of top basket 110, as shown in FIG. 30. This allows user 3110 to transport shopping items 2610, 2810, and 3010 in separate compartments within modular shopping cart 110 easily to counter 3120 so that seller 3130 could easily inventory the purchases, as shown in FIG. 31.

Figure 31:
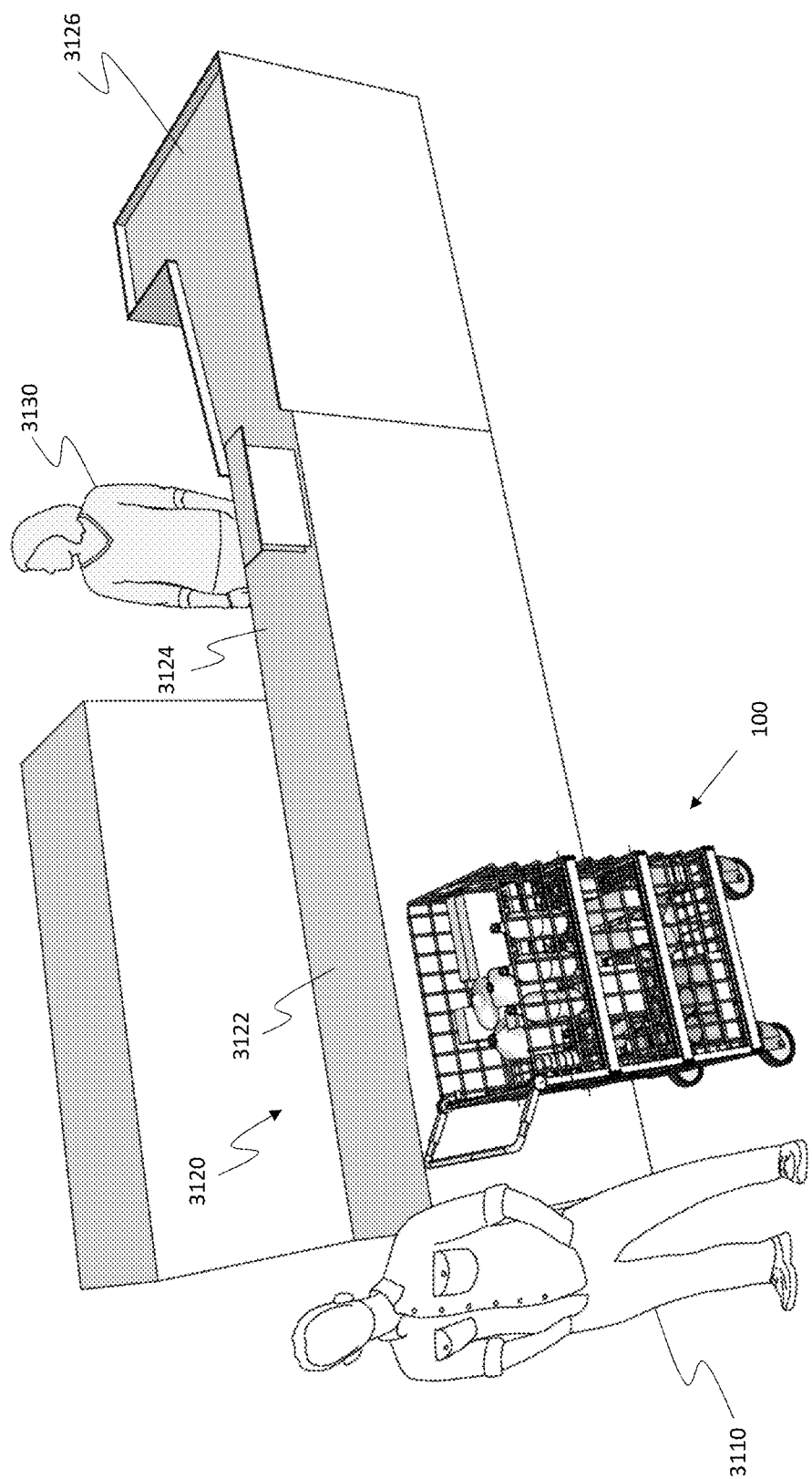
FIG. 31 is a front perspective view of a user of the modular shopping cart of FIG. 1A at a store counter.
Figure 32:
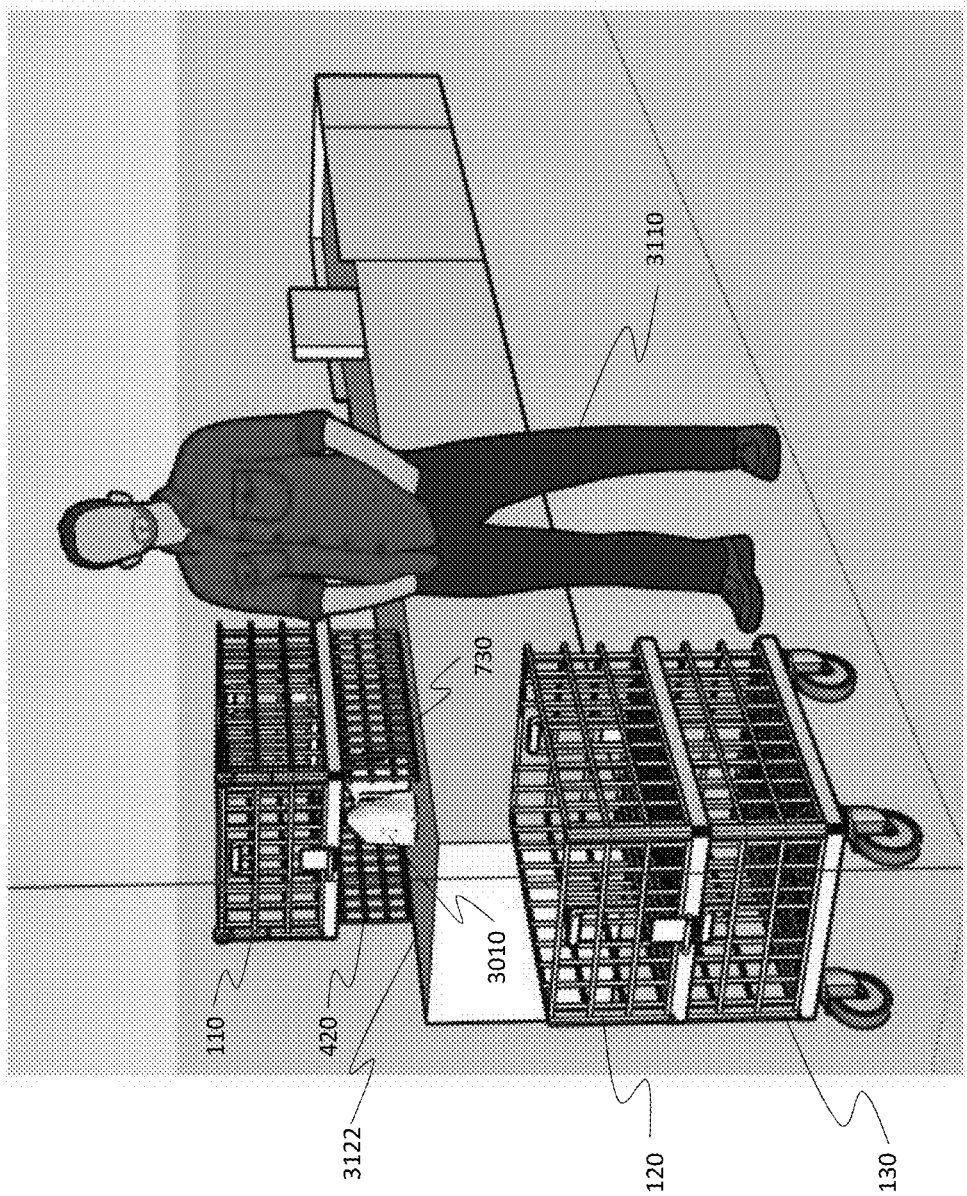
FIG. 32 is a front perspective view of the store counter of FIG. 31 having some shopping items from the top basket placed on the counter.

In FIG. 31, a user 3110 needs to place the shopping items on conveyor belt 3122 that move the shopping items to checkout area 3124, which are then placed in baggage area 3126 after seller 3130 inventories the shopping items. User 3110 could remove the shopping items from each basket, placing the shopping items on conveyor belt 3122 and placing each basket in the checkout area 3124 so that seller 3130 could place the shopping items into the basket during the transaction. In other embodiments, as shown in FIG. 32, a user 3110 could disengage a bottom stop of top basket 110 to easily dump shopping items 3010 onto conveyor belt 3122. In still other embodiments, the user could simply place top basket 110 onto the conveyor belt and allow the seller to individually inventory the items. In such embodiments, where the shopping items have bar codes on their top surface, a seller does not even need to remove the items from top basket 110 to inventory the items, as the seller could merely aim a barcode reader at the bar codes within top basket 110. Preferably, a width of the basket is configured to be shorter than a width of conveyor belt 3122 so that the basket can be easily placed on the conveyor belt for advancement, such as at most two inches shorter or at most four inches shorter. For example, where a conveyor belt is 24 inches wide, a width of each basket of modular shopping cart 100 is preferably at most 22 inches wide. However, baskets having a width wider than a checkout conveyor belt are contemplated.

Figure 33:
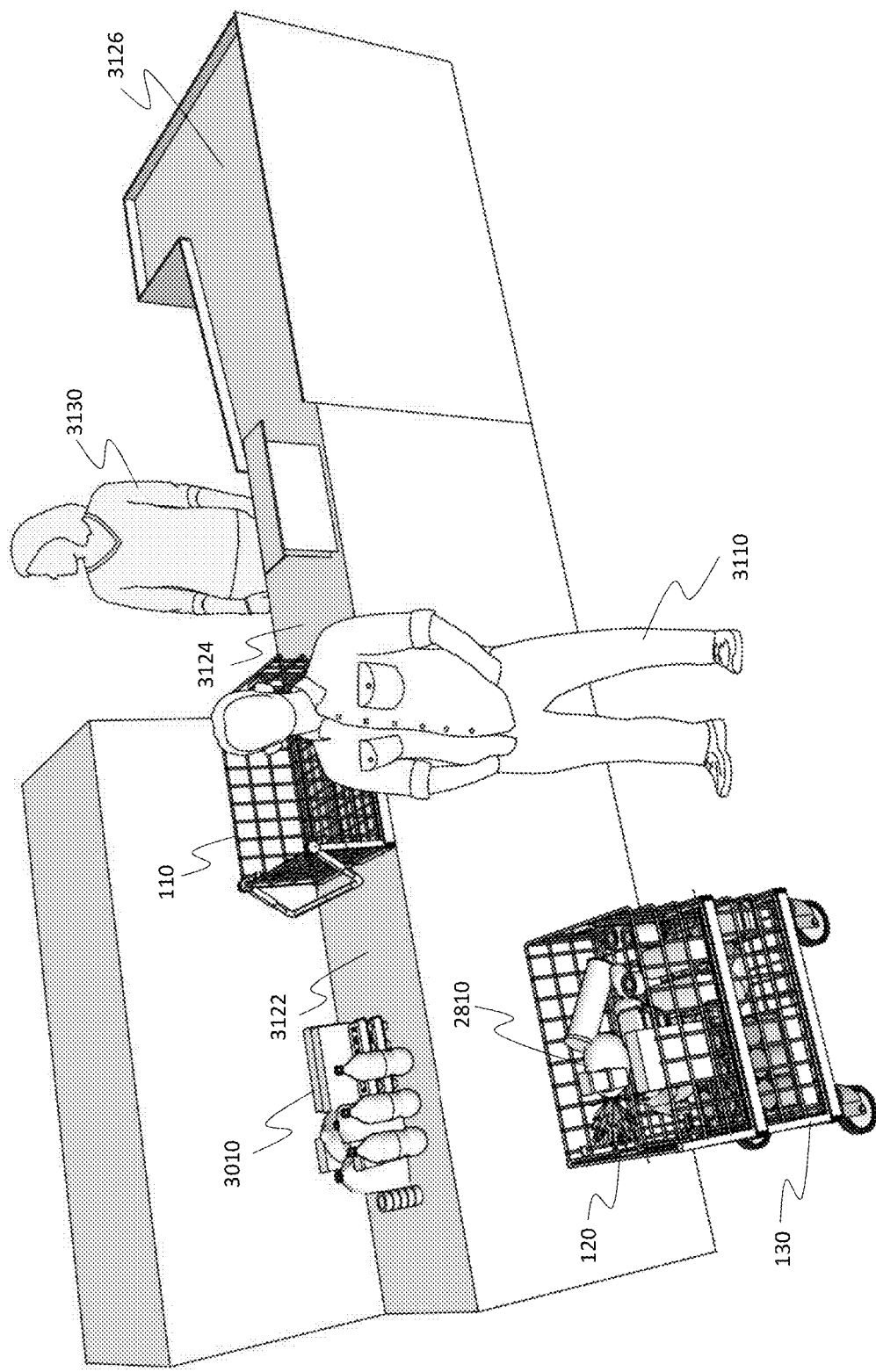
FIG. 33 is a front perspective view of the store counter of FIG. 32 having the top basket placed on the counter.
Figure 34:
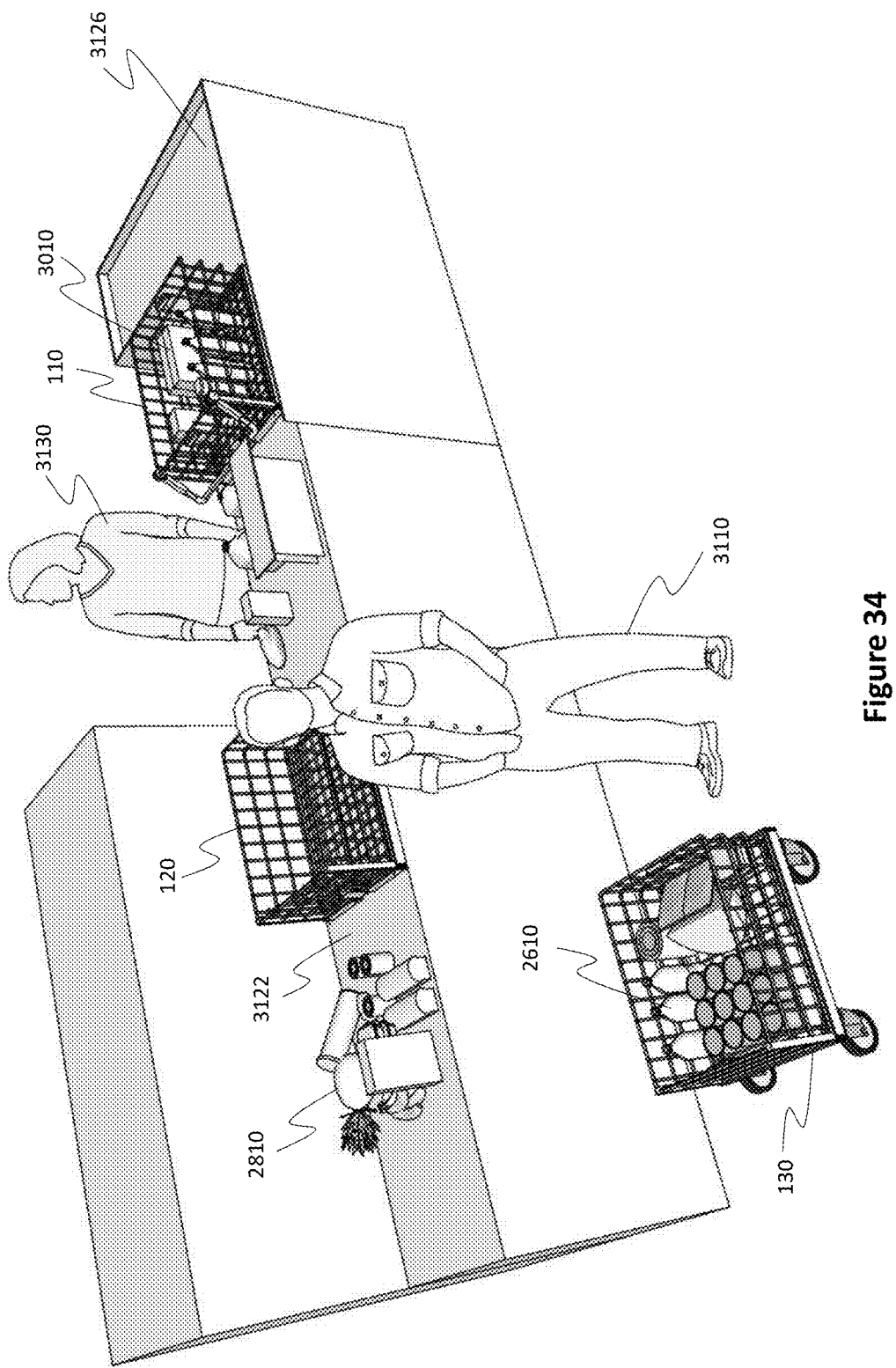
FIG. 34 is a front perspective view of the store counter of FIG. 33 having some shopping items from the middle basket and the middle basket placed on the counter.
Figure 35:
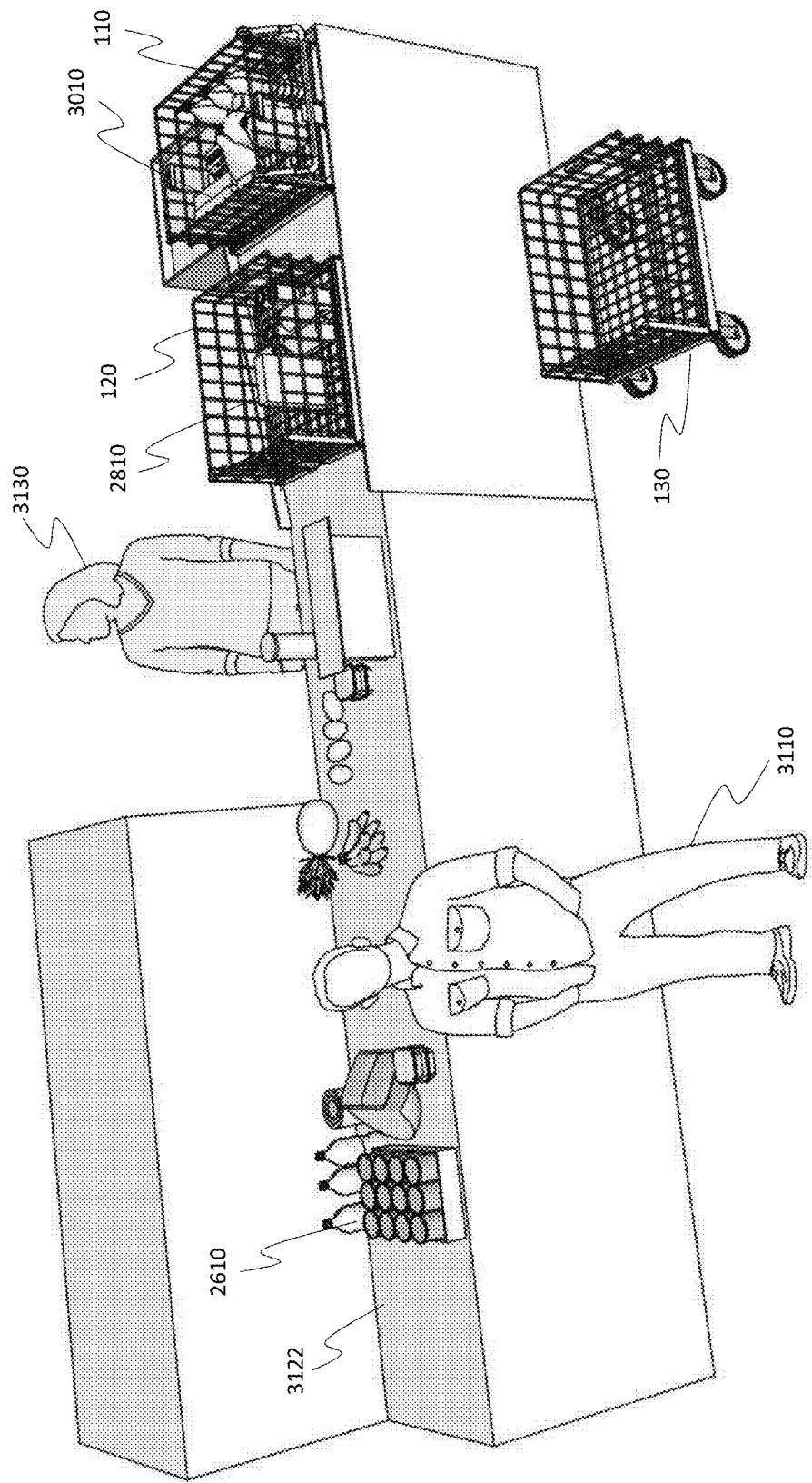
FIG. 35 is a front perspective view of the store counter of FIG. 34 having some shopping items from the bottom basket placed on the counter.
Figure 36:
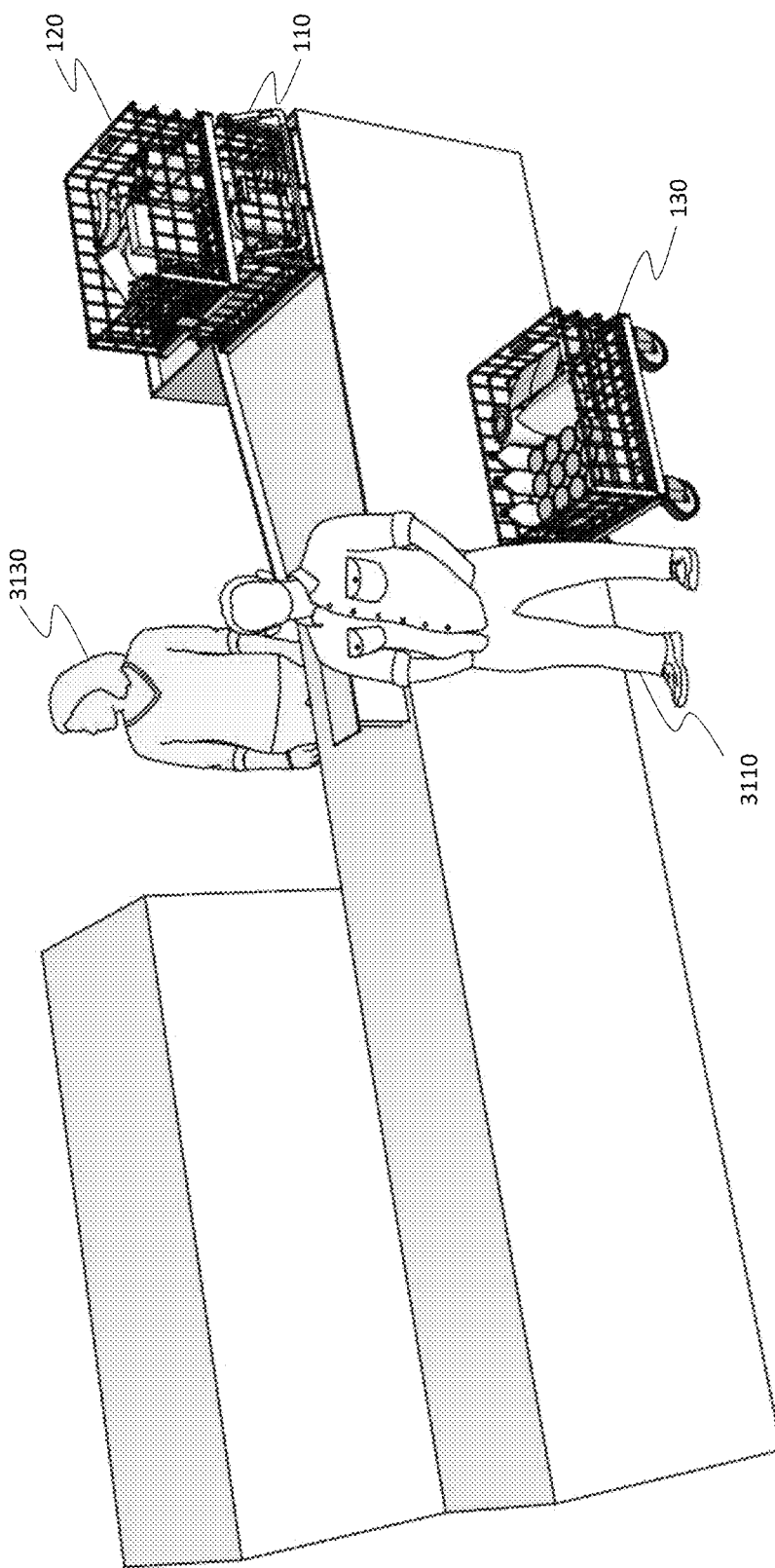
FIG. 36 is a front perspective view of the store counter of FIG. 35 having each of the bottom, middle, and top baskets loaded with shopping items.

In FIG. 33, user 3130 has placed shopping goods 3310 onto conveyor belt 3122 for inventorying, and has given top basket 110 to seller 3130 to place shopping goods 3310 into after inventory. In FIG. 34, seller 3130 has placed shopping goods 3010 into top basket 110 in baggage area 3126, and user 3130 can then place shopping goods 2810 onto conveyor belt 3122 for inventorying. User 3130 could then give middle basket 120 to seller 3130 to place shopping goods 2810 into after inventory. In FIG. 35, seller 3130 has placed shopping goods 2810 into middle basket 120 in baggage area 3126, and user 3130 can then place shopping goods 2610 onto conveyor belt 3122 for inventorying, pushing bottom basket 130 to an area adjacent to baggage area 3126 for shopping goods 2610 to be placed. In FIG. 36, the seller has placed shopping goods 2610 into bottom basket 130.

As shown, the shopping goods have easily been inventoried and placed back into their original baskets due to the modular nature of the baskets of modular shopping cart 100. User 3110 could then assemble modular shopping cart 100 containing the shopping goods, and roll them to a vehicle, where the baskets can be disassembled and placed within storage compartment 2312 after purchase. The baskets could further be used to transport the shopping items elsewhere, for example to a person's home, by assembling modular shopping cart 100 with the shopping items still in the basket.

Figure 37:
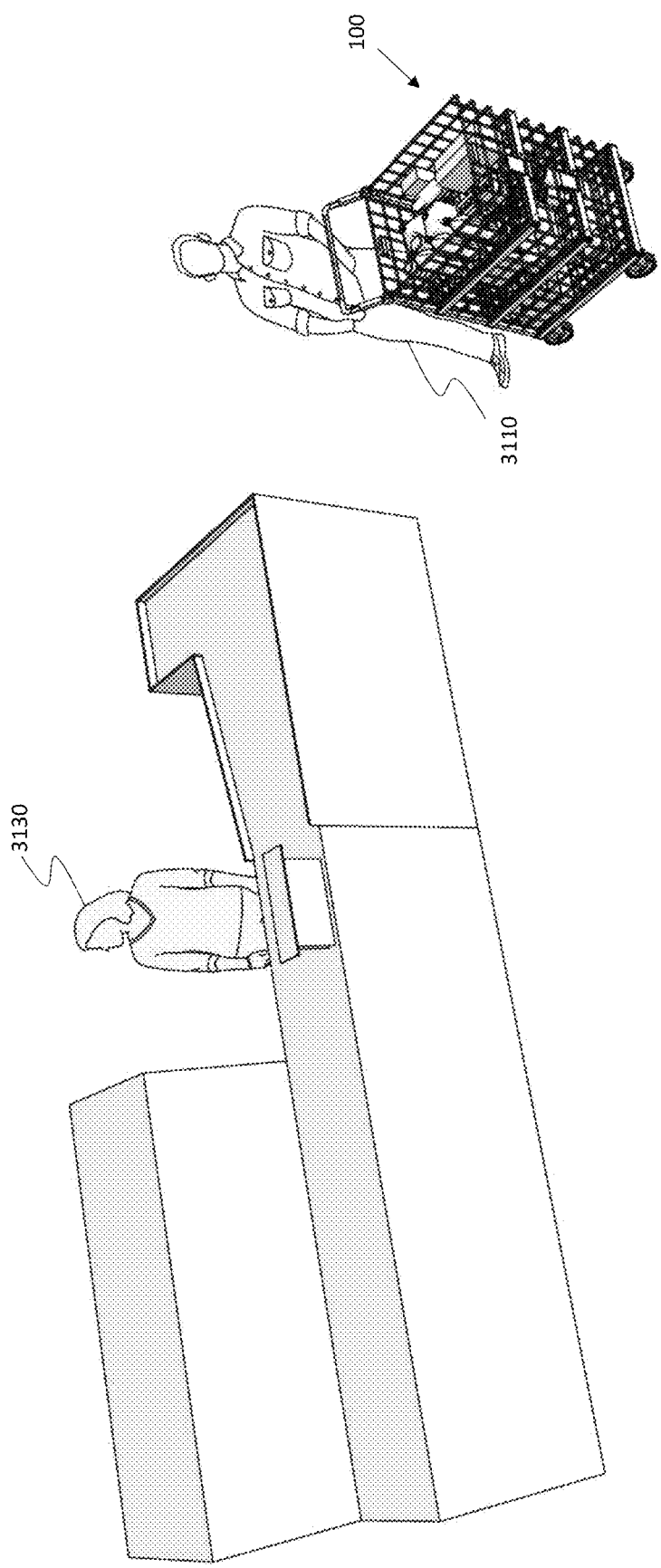
FIG. 37 is a front perspective view of the store counter of FIG. 36 having the modular shopping cart in an assembled formation.
Figure 38:
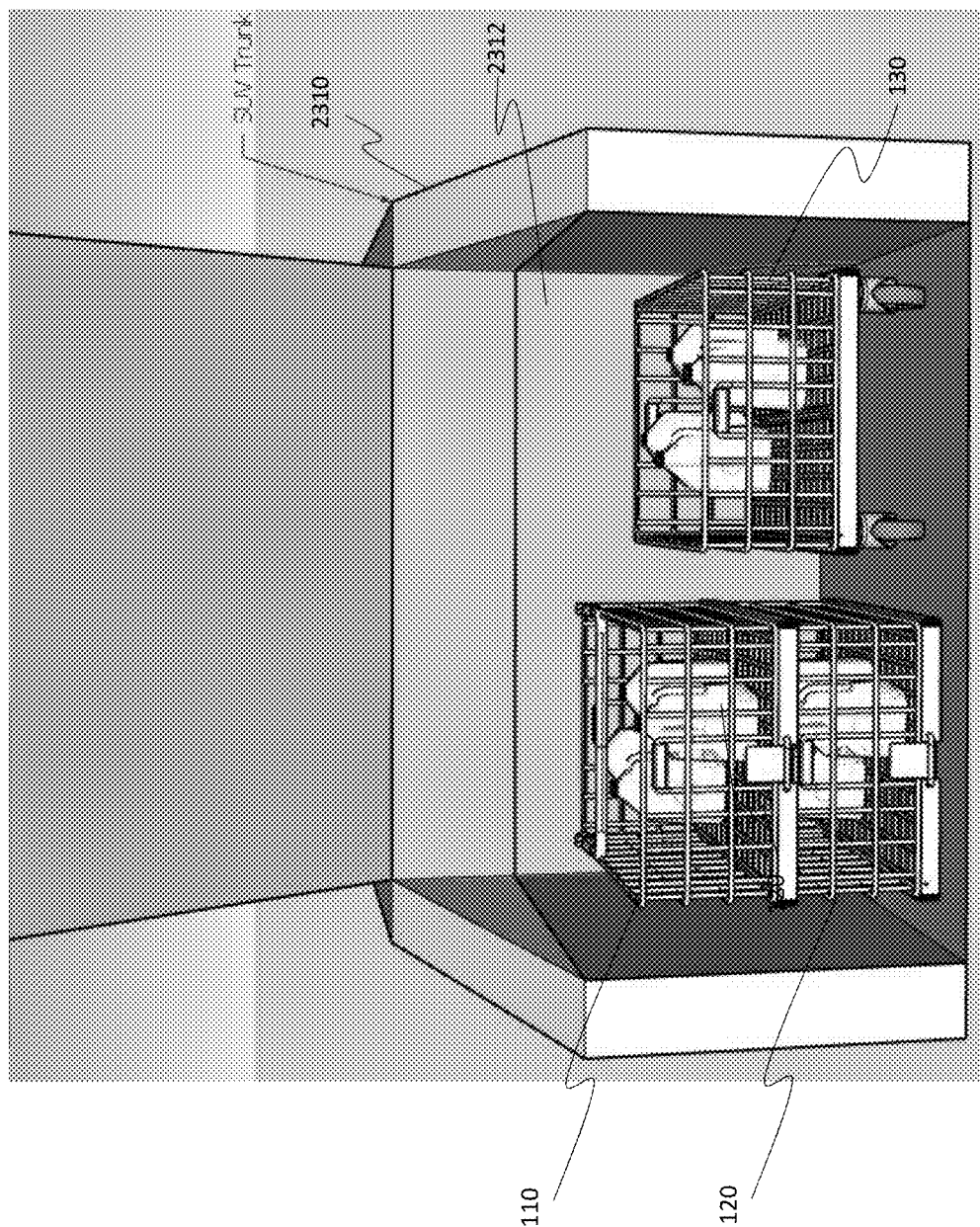
FIG. 38 is a rear perspective view of the vehicle of FIG. 23A having the modular shopping cart of FIG. 37 in a disassembled formation within the vehicle.

Such modular shopping carts with baskets that can be taken apart and put back together allow a user to use the same shopping cart baskets to store shopping containers in their vehicle (as shown in FIG. 23A), to form a shopping cart for use in a store (as shown in FIG. 24B), to separate shopping items in different sections during shopping using deployable false bottoms (as shown in FIG. 30), to easily deposit shopping items in a checkout area for a shopping transaction (as shown in FIGS. 31-36), to easily store the shopping items in a vehicle after purchase (as shown in FIG. 37), and to easily transport the shopping areas from their vehicle to their home or to any other location after the vehicle has been driven to that location.

As used herein, the term lock and latch may be interchangeable. Moreover, the lock and latch may also encompass a catch or supporting surface upon which a panel rests. Additionally, the terms lock and latch or other similar terms used herein may also include a friction fit between two parts or components discussed herein.

The above description is given by way of example, and not limitation. Given the above disclosure, one skilled in the art could devise variations that are within the scope and spirit of the invention disclosed herein, including various ways of manufacturing and using modular shopping carts. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A shopping cart, the cart comprising:
   a bottom basket having a bottom wall, front side wall, left side wall, right side wall and rear sidewall with each of the front, left, right, rear side walls extending from the bottom wall for forming a fully enclosed enclosure accessible from a top opening, the bottom basket having a plurality of wheels attached to the bottom basket extending downwardly to roll the shopping cart on a ground;
   a top basket removably stackable on top of the bottom basket, the top basket having a plurality of side walls and a bottom most wall, the bottom most wall of the top basket having a first panel pivotable between retracted and deployed positions at a first hinge, the first hinge disposed at the lower most edge portions of one of the plurality of side walls of the top basket, in the deployed position, the first panel is capable of supporting an object in the top basket, and in the retracted position, the first panel is traversed out of the way so that an object can be passed through an access pathway defined by upper most and lower most peripheries of the plurality of side walls of the top basket into the bottom basket; and
   a handle attached to the top basket to steer the shopping cart.

2. The shopping cart of claim 1 further comprising:
   a middle basket disposable between the bottom and top baskets, the middle basket having a plurality of side walls and a bottom wall, the bottom wall of the middle basket being foldable and the plurality of side walls defining an access pathway defined by upper and lower peripheries of the plurality of side walls;
   wherein the top basket is removably engageable to the middle basket, and the middle basket is removably engageable to the bottom basket.

3. The shopping cart of claim 1 wherein the top basket and the bottom basket are fabricated from metal, plastic, carbon fiber, wood, or combinations thereof.

4. The shopping cart of claim 1 wherein the bottom panel further comprises a second panel, wherein the first and second panels of the bottom wall are pivotally attached to lower most edge portions of the opposite side walls of the plurality of side walls, the first and second panels being traversable between the retracted and deployed positions, in the retracted position, the first and second panels being pivoted out of a way of the access pathway so that the first and second panels are generally parallel to the side wall to which the first and second panels are pivotally attached, and in the deployed position, the first and second panels are generally perpendicular to the side wall to which the first and second panels are pivotally attached and the first and second panels being retainable in the deployed position to support items in top basket.

5. The shopping cart of claim 4 wherein the first and second panels are lockable with a lock to the retracted position.

6. The shopping cart of claim 4 wherein the first and second panels are lockable with a lock to the deployed position.

7. The shopping cart of claim 1 wherein a width or length of the top and bottom baskets is equal to or less than a width of a conveyor belt in a cashier's aisle of a store or 30 inches.

8. The shopping cart of claim 1 wherein the bottom wall of the top cart is foldable in an upward direction.

9. A method of using a shopping cart, the method comprising the steps of:
   stacking a top basket on top of a bottom basket;
   pivoting a first panel of a bottom most wall of the top basket to a retracted position wherein the first panel of the bottom wall of the top basket being pivotally attached to bottom most edge portions of a plurality of sidewalls of the top basket and being generally perpendicular to the plurality of sidewalls of the top basket in the retracted position;
   retaining the first panel of the bottom wall of the top basket in the retracted position;
   pushing a handle attached to the top basket to roll the shopping cart around an area;

passing a first object through an access pathway defined by plurality of sidewalls of the top basket into an interior space of the bottom basket which is disposed under the top basket;

transitioning the first panel of the bottom wall of the top basket to a deployed position wherein the first panel is perpendicular to the plurality of sidewalls of the top basket;

placing a second object on the bottom wall of the top basket.

10. The method of claim 9 wherein the step of retaining the first panel of the bottom wall of the top basket in the deployed position comprises the step of locking the first panel with a lock in the deployed position.

11. The method of claim 9 wherein transitioning first panel of the bottom wall of the top basket to the deployed position comprises pivoting the first panel.

12. The method of claim 9 wherein the pivoting of the first panel is in the upward direction.

13. The method of claim 9 further comprising the step of locking the top basket to the bottom basket.

14. The method of claim 9 further comprising the steps of:
removing the second object from the top basket;
removing the top basket off of the bottom basket;
removing the first object from the bottom basket;
placing either the first or second object in the bottom basket while the top basket is off of the bottom basket;
stacking the top basket back on top of the bottom basket;
placing the other one of the first or second object in the top basket while the top basket is on the bottom basket.

15. The method of claim 9 further comprising the steps of:
removing the second object from the top basket;
removing the top basket off of the bottom basket;
removing the first object from the bottom basket;
stacking the top basket back on top of the bottom basket;
placing either the first or second object through the access pathway of the top basket and into the bottom basket while the top basket is on the bottom basket and the first and second panels are in the retracted position;
transitioning the first panel of the top basket to the deployed position;
placing the other one of the first or second object in the top basket and on the bottom wall while the top basket is on the bottom basket.

\* \* \* \* \*